United States Patent
Jo et al.

(10) Patent No.: US 12,175,624 B2
(45) Date of Patent: Dec. 24, 2024

(54) SIGNAL PROCESSING APPARATUS AND SIGNAL PROCESSING METHOD

(71) Applicant: SONY SEMICONDUCTOR SOLUTIONS CORPORATION, Kanagawa (JP)

(72) Inventors: Kensei Jo, Kanagawa (JP); Tomohiro Matsukawa, Kanagawa (JP); Mitsuharu Ohki, Kanagawa (JP); Masahiro Watanabe, Kanagawa (JP); Kenichi Tayu, Kanagawa (JP); Keitarou Amagawa, Kanagawa (JP); Kumiko Mahara, Kanagawa (JP); Takahisa Ueno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 404 days.

(21) Appl. No.: 17/597,528

(22) PCT Filed: Jun. 7, 2020

(86) PCT No.: PCT/JP2020/022450
§ 371 (c)(1),
(2) Date: Jan. 10, 2022

(87) PCT Pub. No.: WO2021/014799
PCT Pub. Date: Jan. 28, 2021

(65) Prior Publication Data
US 2022/0284543 A1 Sep. 8, 2022

(30) Foreign Application Priority Data
Jul. 19, 2019 (JP) .................. 2019-133296

(51) Int. Cl.
*G06T 3/4007* (2024.01)
*G06T 5/40* (2006.01)
*G06V 30/18* (2022.01)

(52) U.S. Cl.
CPC ............. *G06T 3/4007* (2013.01); *G06T 5/40* (2013.01); *G06V 30/18095* (2022.01); *G06T 2207/20016* (2013.01); *G06T 2207/20216* (2013.01)

(58) Field of Classification Search
CPC ................... G06T 3/4007; G06T 5/40; G06T 2207/20016; G06T 2207/20216;
(Continued)

(56) References Cited

U.S. PATENT DOCUMENTS 5,793,886 A * 8/1998 Cok ................... H04N 5/21
348/700
2010/0239180 A1 9/2010 Yea et al.
(Continued)

FOREIGN PATENT DOCUMENTS

CN 103700071 A 4/2014
EP 2230640 A1 9/2010
(Continued)

OTHER PUBLICATIONS

International Search Report and Written Opinion of PCT Application No. PCT/JP2020/022450, issued on Sep. 1, 2020, 09 pages of ISRWO.

*Primary Examiner* — John B Strege
(74) *Attorney, Agent, or Firm* — CHIP LAW GROUP

(57) ABSTRACT

A pixel is appropriately interpolated regarding a histogram image in which a distance histogram is allocated to each pixel position. A signal processing apparatus according to the present technology includes a histogram generation unit that inputs a histogram image in which a distance histogram indicating results of a plurality of times of distance measurement as frequency information for each distance is allocated to each pixel position and generates a distance histogram of an interpolation target position in the histogram image on the basis of distance histograms of a plurality of pixel positions near the interpolation target position.

16 Claims, 15 Drawing Sheets

(58) Field of Classification Search
CPC .... G06V 30/18095; G01C 3/06; G01S 17/89; G01S 17/894
See application file for complete search history.

(56) References Cited

U.S. PATENT DOCUMENTS

| | | | |
|---|---|---|---|
| 2011/0098970 A1* | 4/2011 | Hug | G01F 23/292 |
| | | | 702/158 |
| 2011/0194766 A1* | 8/2011 | Otsuki | G06T 5/40 |
| | | | 382/168 |
| 2012/0274798 A1* | 11/2012 | Takahashi | H04N 25/134 |
| | | | 348/222.1 |
| 2018/0014006 A1 | 1/2018 | Pothier et al. | |
| 2018/0253404 A1* | 9/2018 | Moore | G06F 11/0703 |
| 2018/0268522 A1 | 9/2018 | Hawkins et al. | |
| 2018/0365846 A1* | 12/2018 | Sumiyoshi | G06T 7/11 |

FOREIGN PATENT DOCUMENTS

| | | |
|---|---|---|
| JP | 07-191148 A | 7/1995 |
| JP | 2010-218549 A | 9/2010 |
| JP | 2016-219622 A | 12/2016 |

\* cited by examiner $I_{LR}$ REDUCED LUMINANCE INFORMATION $I_{HR}$ HIGH RESOLUTION LUMINANCE INFORMATION

HIGH-RESOLUTION OUTPUT INFORMATION

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2020/022450 filed on Jun. 7, 2020, which claims priority benefit of Japanese Patent Application No. JP 2019-133296 filed in the Japan Patent Office on Jul. 19, 2019. Each of the above-referenced applications is hereby incorporated herein by reference in its entirety.

TECHNICAL FIELD

The present technology relates to a signal processing apparatus and a method thereof, and more particularly, to a technology for processing a distance histogram indicating results of a plurality of times of distance measurement as frequency information for each distance.

BACKGROUND ART

Various distance measurement techniques to measure a distance to a target object have been known, and in recent years, for example, a distance measurement technique by a time of flight (ToF) method has attracted attention.
Patent document 1 below discloses a technique for measuring a distance to an object (reflector) using pulse light.

CITATION LIST

Patent Document

Patent Document 1: Japanese Patent Application Laid-Open No. 07-191148

SUMMARY OF THE INVENTION

Problems to be Solved by the Invention

Here, because reliability of a distance measurement result is low when time of flight for only one pulse is measured in a case where distance measurement using pulse light is performed as the ToF method, it is considered to measure the time of flight a plurality of times by emitting pulses a plurality of times and obtain an average of these as final distance information.

However, with the method for obtaining the average of the results of the plurality of times of distance measurement, there is a possibility that it is not possible to obtain accurate distance information in a case where objects overlap in a depth direction, for example, in a scene where an object exists behind a wire mesh or the like.

Therefore, it is considered that the results of the plurality of times of distance measurement are treated as frequency information for each distance. Specifically, the results are treated as information (histogram information) regarding a frequency distribution in which a distance is used as a class, such as a frequency at which a distance A is measured, a frequency at which a distance B is measured, a frequency at which a distance C is measured . . . . Hereinafter, the information regarding the frequency distribution indicating the results of the plurality of times of the distance measurement as the frequency information for each distance in this way is referred to as a "distance histogram".

By using the distance histogram, even if a plurality of objects overlaps in the depth direction, it is expected that frequency peaks appear at different distances in the histogram, it is possible to obtain the distances of the respective objects that overlap in the depth direction, and accurate distance measurement can be achieved.

Here, as the distance measurement, for example, it is possible to grasp a three-dimensional shape of a target object by performing distance measurement on a plurality of portions of a target object such as a person or a vehicle. In such a case, reflected light from the target object is received using an array sensor in which a plurality of light reception elements is two-dimensionally arranged as in an image sensor, and distance measurement is performed for each pixel. Then, at this time, in a case where the distance histogram described above is used, a histogram image in which a distance histogram is allocated to each pixel is acquired.

An object of the present technology is to appropriately perform pixel interpolation regarding a histogram image in which a distance histogram is allocated to each pixel position in this way.

Solutions to Problems

A signal processing apparatus according to the present technology includes a histogram generation unit that inputs a histogram image in which a distance histogram indicating results of a plurality of times of distance measurement as frequency information for each distance is allocated to each pixel position and generates a distance histogram of an interpolation target position in the histogram image on the basis of distance histograms of a plurality of pixel positions near the interpolation target position.

By interpolating the distance histogram on the basis of the distance histogram in this way, it is possible to improve accuracy of the interpolation.

In the signal processing apparatus according to the present technology described above, it is considered that the histogram generation unit has a configuration that acquires information regarding a correlation direction that is a direction determined from a result of image correlation calculation performed for a plurality of directions in an image plane with reference to the interpolation target position and generates the distance histogram of the interpolation target position using weight information for each pixel position near the interpolation target position determined according to the correlation direction.

By generating the distance histogram of the interpolation target position using the weight information of each neighboring pixel according to the correlation direction in this way, it is possible to prevent that an image correlation in an edge direction is broken by the interpolated distance histogram.

In the signal processing apparatus according to the present technology described above, it is considered that the histogram generation unit has a configuration that generates a histogram of the interpolation target position by averaging the distance histograms of the plurality of pixel positions near the interpolation target position by weighting based on the weight information for each pixel position.

As a result, it is possible to appropriately generate the distance histogram of the interpolation target position on the basis of the weight information according to the correlation direction.

In the signal processing apparatus according to the present technology described above, it is considered that the histogram generation unit has a configuration that generates the distance histogram of the interpolation target position using weight information determined according to a distance from the interpolation target position for each pixel position near the interpolation target position.

As a result, it is possible to appropriately generate the distance histogram of the interpolation target position on the basis of the weight information according to the distance between the interpolation target position and the neighboring pixel.

In the signal processing apparatus according to the present technology described above, it is considered that the histogram generation unit has a configuration that generates the distance histogram of the interpolation target position using weight information determined according to a luminance difference from the interpolation target position for each pixel position near the interpolation target position.

As a result, it is possible to appropriately generate the distance histogram of the interpolation target position on the basis of the weight information according to the luminance difference between the interpolation target position and the neighboring pixel.

In the signal processing apparatus according to the present technology described above, it is considered that the histogram generation unit has a configuration that generates the distance histogram of the interpolation target position using the weight information determined according to the distance from the interpolation target position for each pixel position near the interpolation target position and the weight information determined according to the luminance difference from the interpolation target position for each pixel position near the interpolation target position.

As a result, it is possible to appropriately generate the distance histogram of the interpolation target position on the basis of both of the weight information according to the distance from the interpolation target position and the weight information according to the luminance difference from the interpolation target position.

In the signal processing apparatus according to the present technology described above, it is considered that a histogram image input by the histogram generation unit is a reduced histogram image obtained by performing low-resolution conversion on an original histogram image, and the histogram generation unit has a configuration that inputs high resolution information that is information with a higher resolution than the reduced histogram image and is information in which information other than a distance histogram is allocated for each pixel position and generates a histogram image with a higher resolution than the reduced histogram image on the basis of the high resolution information and the reduced histogram image.

The reduced histogram image described above has a data amount less than the original histogram image with a high resolution, and the high resolution information is the information in which the information other than the distance histogram is allocated to each pixel position. Therefore, the high resolution information can be information having a data amount less than a histogram image. That is, the data amount of both of the reduced histogram image and the high resolution information can be less than the data amount of the original histogram image with a high resolution. Then, according to the configuration described above, the reduced histogram image is upsampled to the histogram image with a high resolution on the basis of the reduced histogram image and the high resolution information. Therefore, when a histogram image with a predetermined resolution is transmitted, a transmission data amount can be reduced than that in a case where the original histogram image with a high resolution is transmitted as it is.

In the signal processing apparatus according to the present technology described above, it is considered that the histogram generation unit has a configuration that inputs the reduced histogram image generated by performing the low-resolution conversion performed by adding a distance histogram between adjacent pixels in the original histogram image.

As a result, the distance histogram can be interpolated on the basis of the reduced histogram image having a higher signal-to-noise ratio (SNR) than the original histogram image.

In the signal processing apparatus according to the present technology described above, it is considered that the high resolution information has a configuration that is high resolution luminance information of which a distance histogram of each pixel position of the original histogram image is converted into a luminance.

It is possible to appropriately determine the correlation direction regarding the interpolation target position and calculate the luminance difference between the interpolation target position and the neighboring pixel position on the basis of such high resolution luminance information.

In the signal processing apparatus according to the present technology described above, it is considered that the high resolution luminance information has a configuration that is information in which a value based on a sum of frequencies of respective distances of a distance histogram is allocated to each pixel position of the original histogram image.

A sum of frequencies of respective distances of a distance histogram obtained regarding a certain pixel position is information corresponding to a luminance of the pixel position.

In the signal processing apparatus according to the present technology described above, it is considered that the high resolution information has a configuration that is high-resolution direction information in which information regarding a correlation direction that is a direction determined for each pixel position from a result of image correlation calculation performed for a plurality of directions in an image plane for each pixel position of the original histogram image is allocated to each pixel position.

As a result, when upsampling is performed on the reduced histogram image, it is not needed for an input side of the reduced histogram image to calculate an image correlation in order to determine the correlation direction.

In the signal processing apparatus according to the present technology described above, it is considered that the histogram generation unit has a configuration that performs upsampling on the reduced histogram image by a bilinear interpolation method and executes image filter processing based on the correlation direction for each pixel position indicated by the high-resolution direction information on the upsampled histogram image.

As a result, regarding the high-resolution histogram image obtained by upsampling by the bilinear interpolation method, it is possible to blur the distance histogram in the edge direction through the image filter processing based on the correlation direction.

In the signal processing apparatus according to the present technology described above, it is considered that the histogram generation unit has a configuration that inputs a histogram image generated on the basis of a reception signal from a light reception unit in which a plurality of pixels having a light reception element is two-dimensionally arranged as the histogram image and generates a distance histogram of a pixel position of a defective pixel in the input histogram image on the basis of distance histograms of a plurality of pixel positions positioned near the pixel position of the defective pixel in the histogram image.

As a result, even in a case where some pixels in the light reception unit have a defect, the distance histogram of the defective pixel is interpolated on the basis of the distance histogram of the neighboring pixel.

In the signal processing apparatus according to the present technology described above, it is considered that the histogram generation unit has a configuration that generates the distance histogram of the interpolation target position from the distance histograms of the plurality of pixel positions near the interpolation target position on the basis of a captured image obtained by imaging an object to be a distance measurement target of the input histogram image.

As a result, it is possible to use the captured image with a higher SNR than a distance image as a reference image used when the distance histogram of the interpolation target position is generated from the distance histogram of the neighboring pixel.

In the signal processing apparatus according to the present technology described above, it is considered that the histogram generation unit has a configuration that acquires information regarding the correlation direction determined from a result of the image correlation calculation with respect to a captured image obtained by imaging an object to be a distance measurement target of the input histogram image as information regarding the correlation direction.

As a result, it is possible to use the information regarding the correlation direction obtained from the captured image with a higher SNR than the distance image as the information regarding the correlation direction used to interpolate the distance histogram.

Furthermore, a signal processing method according to the present technology is a signal processing method for inputting a histogram image in which a distance histogram indicating results of a plurality of times of distance measurement as frequency information for each distance is allocated to each pixel position and generating a distance histogram of an interpolation target position in the histogram image on the basis of distance histograms of a plurality of pixel positions near the interpolation target position.

According to such a signal processing method, actions similar to those of the signal processing apparatus according to the present technology described above can be obtained.

MODE FOR CARRYING OUT THE INVENTION

Hereinafter, embodiments according to the present technology will be described in the following order with reference to the accompanying drawings.

<1. First Embodiment>
[1-1. Configuration of Signal Processing Apparatus]
[1-2. Interpolation Processing Example I]
[1-3. Interpolation Processing Example II]
[1-4. Interpolation Processing Example III]
[1-5. First Modification of High Resolution Information]
[1-6. Second Modification of High Resolution Information]
<2. Second Embodiment>
<3. Modification>
<4. Summary of Embodiments>
<5. Present Technology>

1. First Embodiment 1-1. Configuration of Signal Processing Apparatus

Figure 1:
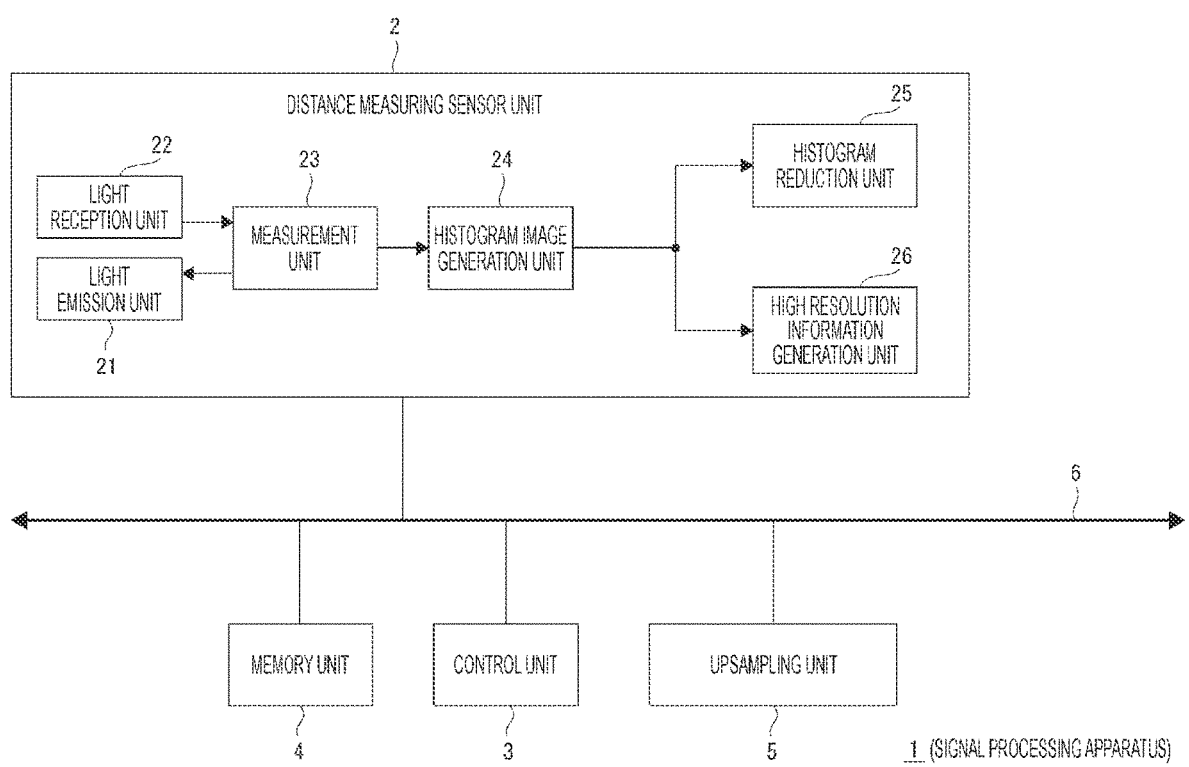
FIG. 1 is a block diagram illustrating an internal configuration example of a signal processing apparatus as a first embodiment of the present technology.

FIG. 1 is a block diagram illustrating an internal configuration example of a signal processing apparatus 1 as a first embodiment according to the present technology.

As illustrated, the signal processing apparatus 1 includes a distance measuring sensor unit 2, a control unit 3, a memory unit 4, an upsampling unit 5, and a bus 6. The distance measuring sensor unit 2, the control unit 3, the memory unit 4, and the upsampling unit 5 can perform data communication with each other via the bus 6.

The distance measuring sensor unit 2 includes a light emission unit 21 and a light reception unit 22 and has a function for measuring a distance to a target object on the basis of a result of receiving light, which is emitted by the light emission unit 21 and is reflected by the target object, by the light reception unit 22.

Specifically, the distance measuring sensor unit 2 of the present example includes a measurement unit 23, a histogram image generation unit 24, a histogram reduction unit 25, and a high resolution information generation unit 26 together with the light emission unit 21 and the light reception unit 22 described above. The distance measuring sensor unit 2 of the present example has a configuration in which these units are mounted on the same substrate.

Here, it is assumed that "resolution" herein mean "spatial resolution" unless otherwise specified.

The light emission unit 21 emits light with a plurality of light sources. The light emission unit 21 of the present example includes a light emission element with a vertical cavity surface emitting laser (VCSEL) as each light source and includes there light emission elements that are two-dimensionally arranged in a predetermined form such as a matrix, for example.

The light reception unit 22 includes a plurality of pixels (light reception element) each having a light reception element that receives light emitted by the light emission unit 21 and reflected by the target object. These pixels are two-dimensionally arranged in a predetermined form such as a matrix, for example.

The light reception unit 22 of the present example supports distance measurement by a time of flight (ToF) method and includes a single photon avalanche diode (SPAD) element as a light reception element of each pixel.

The measurement unit 23 controls light emission of the light emission unit 21 and measures a distance for each pixel by the ToF method, specifically a direct ToF method in the present example, on the basis of a light reception signal by the light reception unit 22. In a case where the direct ToF method is adopted, the measurement unit 23 makes each light emission element of the light emission unit 21 perform pulse emission. Then, the measurement unit 23 detects a time difference from a light emission timing of the light emission unit 21 to a light reception timing by the light reception element for each pixel of the light reception unit 22 and calculates a distance for each pixel on the basis of the time difference and the speed of light.

Here, in order to obtain final distance measurement information regarding the target object, the measurement unit 23 calculates the distance on the basis of the time difference from the light emission to the light reception as described above a plurality of times per unit time. Specifically, the number of times of such distance measurement per unit time is, for example, about several hundred thousands or several millions times.

The histogram image generation unit 24 inputs information regarding the distances that are obtained by the measurement unit 23 a plurality of times per unit time as described above for each pixel and generates a histogram image. Here, the histogram image means information in which a "distance histogram" indicating the results of the distance measurement obtained the plurality of times per unit time as described above as frequency information for each distance is allocated to each pixel position.

Figure 2:
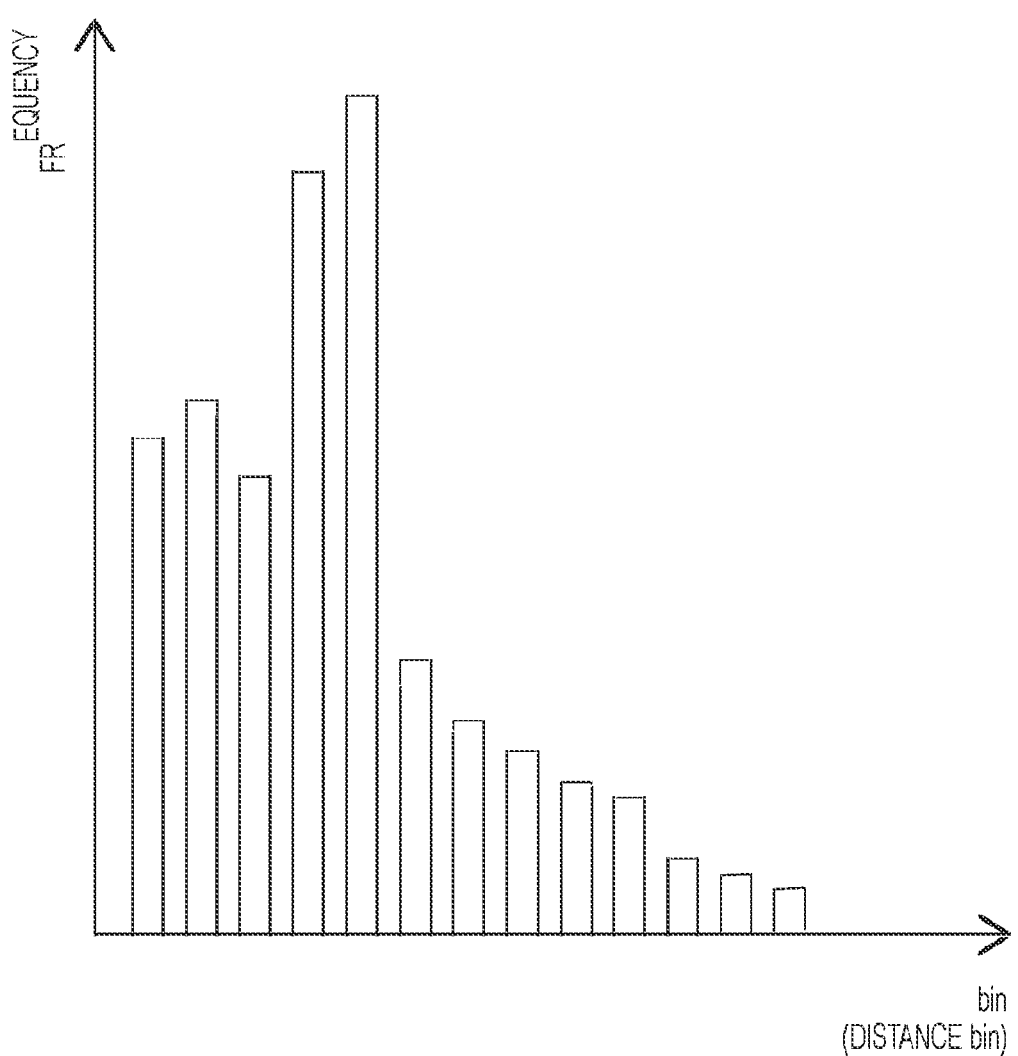
FIG. 2 is an explanatory diagram of a distance histogram according to an embodiment.

FIG. 2 is an explanatory diagram of a distance histogram.

As illustrated, the distance histogram is frequency distribution information using a class as a distance and a frequency for each class as a frequency. Here, in the following description, each class in the frequency distribution information as such a distance histogram is referred to as a "bin" (distance bin).

As described above, by using such a distance histogram, even in a case where objects overlap in a depth direction such as a scene where an object exists behind a wire mesh, frequency peaks are expected to appear at different distances in the histogram. It is possible to respectively obtain the distances of the respective objects that overlap in the depth direction, and it is possible to achieve accurate distance measurement.

In the distance measuring sensor unit 2 illustrated in FIG. 1, the histogram image generated by the histogram image generation unit 24 is input to the histogram reduction unit 25 and the high resolution information generation unit 26. However, processing executed by the histogram reduction unit 25 and the high resolution information generation unit 26 will be described later.

The control unit 3 includes a microcomputer including, for example, a central processing unit (CPU), a read only memory (ROM), a random access memory (RAM), or the like. The control unit 3 controls the entire signal processing apparatus 1, for example, by executing processing according to a program stored in the ROM.

For example, the control unit 3 instructs the distance measuring sensor unit 2 and the upsampling unit 5 described later to start or stop various types of processing. Furthermore, the control unit 3 can analyze a distance for each pixel (for example, analysis of distance based on frequency peak or the like in distance histogram described above) on the basis of the histogram image (distance histogram) obtained by the distance measuring sensor unit 2.

The memory unit 4 is a non-volatile memory that can write/read data and is used to store various types of data. For example, the memory unit 4 is used to store data that is used for various types of control by the control unit 3. Furthermore, the memory unit 4 can be used to store a reduced histogram image and high resolution information to be described later obtained by the distance measuring sensor unit 2 and to store an upsampled histogram image obtained by the upsampling unit 5.

The upsampling unit 5 inputs the reduced histogram image generated by the histogram reduction unit 25 as described later and performs upsampling on the reduced histogram on the basis of the high resolution information generated by the high resolution information generation unit 26. Note that processing executed by the upsampling unit 5 will be described later.

1-2. Interpolation Processing Example I

Figure 3:
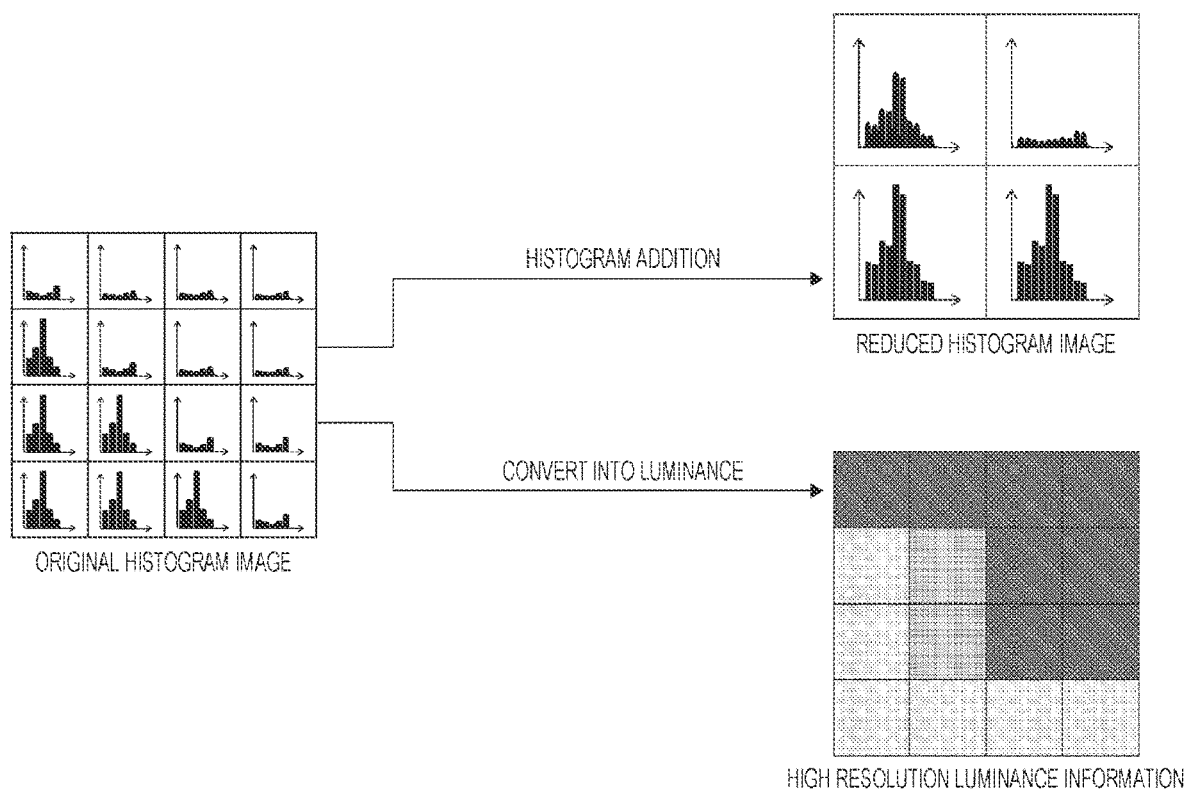
FIG. 3 is an explanatory diagram regarding a reduced histogram image and high resolution information in an interpolation processing example I.

An interpolation processing example I according to a first embodiment will be described with reference to FIGS. 3 and 4.

First, as a premise, in the present example, the histogram image obtained by the histogram image generation unit 24 (original histogram image) with an original resolution is not used as it is, and a low-resolution-converted histogram image is used.

Here, regarding the histogram image generated by the histogram image generation unit 24, only one-value distance is not allocated for each pixel, as in a general depth image, and a plurality of values representing a frequency for each bin (distance) is allocated. Therefore, in a case where this is transmitted with the original resolution, it is necessary to secure a certain bandwidth of a transmission path.

Furthermore, in the ToF method, it is desirable for the light reception unit 22 to receive only light from the light emission unit 21 as a light source in order to enhance distance measurement accuracy. However, because the light reception unit 22 receives natural light in practice, it is difficult to improve a signal-to-noise ratio (SNR).

In consideration of these points, in the present example, the histogram image obtained by the histogram image generation unit 24 with the original resolution is not used, and a low-resolution-converted image is used.

Therefore, the histogram reduction unit 25 is provided in the signal processing apparatus 1 of the present example. The histogram reduction unit 25 performs low-resolution conversion on the histogram image obtained by the histogram image generation unit 24 and obtains a reduced histogram image of which the resolution is reduced. Specifically, the histogram reduction unit 25 performs low-resolution conversion on the histogram image obtained by the histogram image generation unit 24 by adding a distance histogram between adjacent pixels (refer to FIG. 3). For example, if the resolution is reduced to ¼, distance histograms of 2×2=4 pixels in an adjacent relation are added and assumed as a distance histogram for one pixel in the reduced histogram image. At this time, the distance histograms are added by adding frequencies for each bin.

By performing such pixel addition, a histogram image of which the resolution is decreased than the original histogram image and the SNR is improved can be obtained.

In the present example, by upsampling the reduced histogram image obtained by the histogram reduction unit 25 as described above on the basis of the high resolution information generated by the high resolution information generation unit 26 illustrated in FIG. 1, the resolution of the histogram image obtained by the histogram image generation unit 24 is restored to the original resolution.

The high resolution information generation unit 26 illustrated in FIG. 1 generates high resolution luminance information as the high resolution information. In the present example, the high resolution luminance information is information of which the distance histogram at each pixel position of the original histogram image, that is, the histogram image obtained by the histogram image generation unit 24 is converted into a luminance (refer to FIG. 3). Here, in the histogram image, the luminance at each pixel position can be obtained as a sum of frequencies for each distance bin in the distance histogram of each pixel position. Therefore, the high resolution information generation unit 26 calculates the sum of the distance histogram for each pixel position of the histogram image obtained by the histogram image generation unit 24 and generates information in which a value of the calculated sum is allocated to each pixel position as the high resolution luminance information.

Note that the high resolution information is not limited to information regarding a luminance. For example, a frequency peak value of the distance histogram at a certain pixel position roughly represents a distance at the pixel position. Therefore, information in which the peak value is allocated to each pixel position can be used as the high resolution information.

Figure 4:
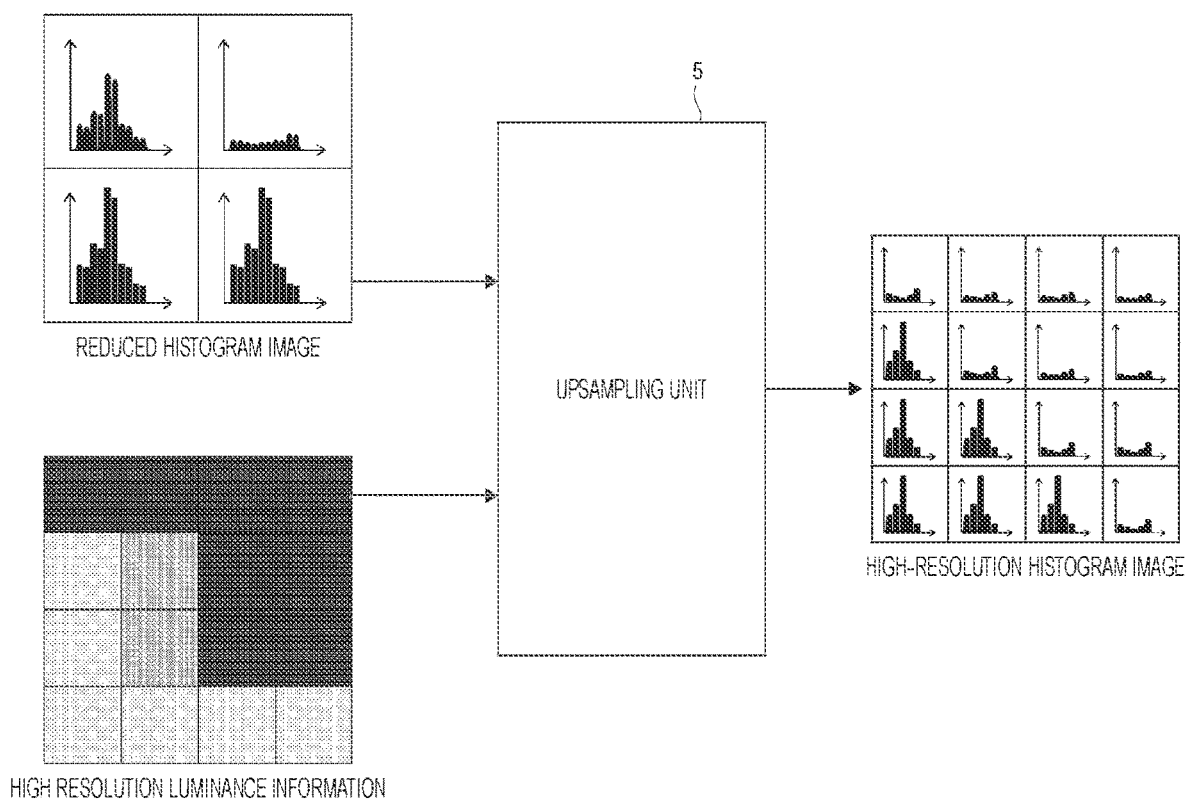
FIG. 4 is an explanatory diagram of an upsampling method in the interpolation processing example I.

In the interpolation processing example I, the upsampling unit 5 performs upsampling on the reduced histogram image obtained by the histogram image generation unit 24 to the histogram image with the original resolution on the basis of the high resolution luminance information obtained by the high resolution information generation unit 26 (refer to FIG. 4).

In the present example, the reduced histogram image obtained by the histogram image generation unit 24 and the high resolution luminance information obtained by the high resolution information generation unit 26 are temporarily stored in the memory unit 4. The upsampling unit 5 of the present example executes upsampling processing using the reduced histogram image and the high resolution luminance information stored in the memory unit 4 in this way.

Figure 5:
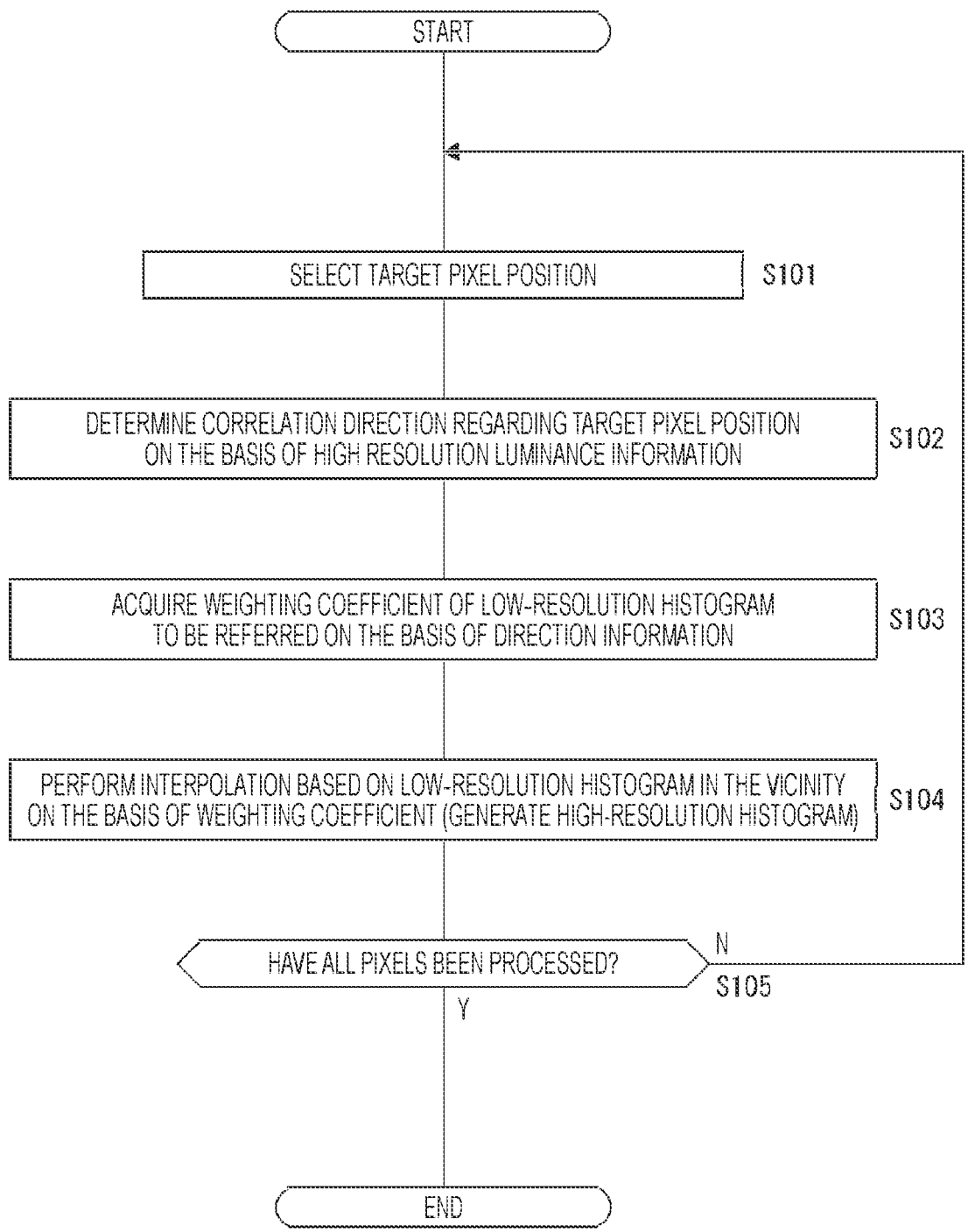
FIG. 5 is a flowchart illustrating a specific procedure example of processing executed by upsampling in the interpolation processing example I.

FIG. 5 is a flowchart illustrating a specific procedure example of the processing executed by the upsampling unit 5.

First, the upsampling unit 5 selects a target pixel position in step S101. That is, in an image space with a resolution after upsampling, a pixel position to be an interpolation processing target is selected.

In the subsequent step S102, the upsampling unit 5 determines a correlation direction regarding a target pixel on the basis of the high resolution luminance information.

Figure 6:
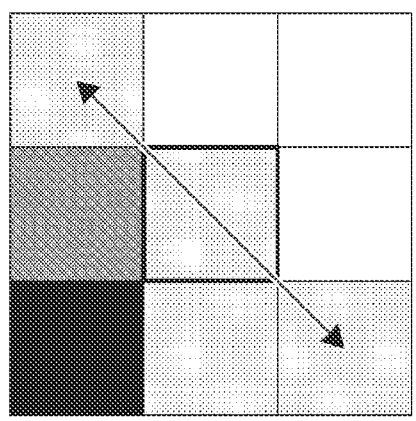
FIG. 6 is an explanatory diagram regarding a correlation direction.

FIG. 6 is an explanatory diagram regarding a correlation direction.

The correlation direction here means a direction determined from results of image correlation calculation performed for a plurality of directions in an image plane with a target pixel position as a reference. Specifically, the correlation direction in the present example means a direction determined to have the highest correlation as a result of image correlation calculation performed for the plurality of directions.

FIG. 6 schematically illustrates luminance information of 3×3=9 pixels centered on the target pixel position (indicated by thick black frame in FIG. 6) in the high resolution luminance information. In the present example, it is assumed to determine that the correlation direction is any one of four directions including vertical, horizontal, oblique right, and oblique left directions.

As a specific determination method, a correlation of luminance values is calculated for each of two pixels adjacent to the target pixel position in the vertical direction, two pixels adjacent to the target pixel position in the horizontal direction, two pixels adjacent to the target pixel position in the right oblique direction, and two pixels adjacent to the target pixel position in the left oblique direction. For the correlation calculation here, for example, Sum of Absolute Difference (SAD), Sum of Squared Difference (SSD), Normalized Cross Correlation (NCC), Zero means NCC (ZNCC), or the like can be used. Then, the direction in which a value indicating the highest correlation among the correlation values calculated for each direction in this way is obtained is determined as the correlation direction. FIG. 6 schematically illustrates the correlation calculation performed for the right oblique direction.

Here, determination of a correlation direction of a luminance image can be rephrased as determination of an edge direction. Therefore, the determination processing in step S102 can be executed as processing for determining an edge direction.

In FIG. 5, the upsampling unit 5 proceeds the procedure to step S103 in response to the determination of the correlation direction in step S102 and acquires a weighting coefficient of a low-resolution histogram to be referred on the basis of direction information.

Figure 7A:
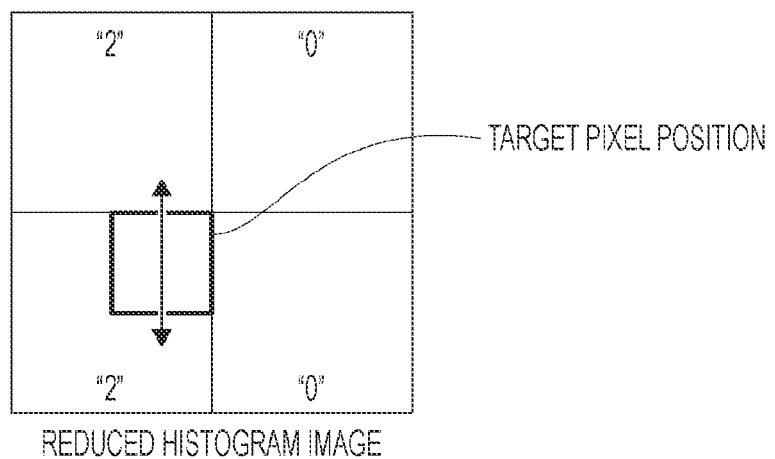
FIGS. 7A and 7B are diagrams illustrating an example of a weighting coefficient determined for each correlation direction.
Figure 7B:
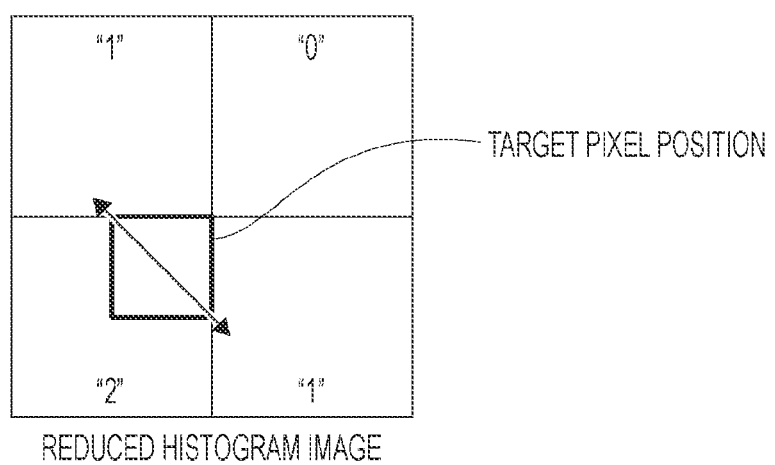

FIGS. 7A and 7B illustrate an example of a weighting coefficient determined for each correlation direction.

In FIGS. 7A and 7B, as examples, a weighting coefficient determined in a case where the correlation direction is a vertical direction (FIG. 7A) and a weighting coefficient determined in a case where the correlation direction is a left oblique direction (FIG. 7B) are illustrated.

As a premise, in the present example, in the upsampling of the reduced histogram image, four pixels in total including one pixel including the target pixel position in the reduced histogram image and three pixels that are vertically, horizontally, and obliquely adjacent to the target pixel position are set as neighboring pixels of the target pixel position, distance histograms of these neighboring pixels are added according to the weighting coefficient, and the distance histogram of the target pixel position is generated. Specifically, the distance histogram at the target pixel position is generated by averaging the distance histograms of the neighboring pixels according to the respective weighting coefficients of the neighboring pixels.

In the example (FIG. 7A) in which the correlation direction in the drawing=the vertical direction, weighting coefficients of a pixel including the target pixel position and a pixel adjacent to the target pixel position in the vertical direction are determined to be "2", and weighting coefficients of a pixel adjacent to the target pixel position in the oblique direction and a pixel adjacent in the horizontal direction are determined to be "0". Furthermore, in the example (FIG. 7B) in which the correlation direction=the oblique right direction, the weighting coefficient of the pixel including the target pixel position is determined to be "2", the weighting coefficients of the pixel adjacent to the target pixel position in the vertical direction and the pixel adjacent in the horizontal direction are determined to be "1", and the weighting coefficient of the pixel adjacent to the target pixel position in the oblique direction is determined to be "0".

For example, as in these examples, the weighting coefficient of each neighboring pixel referred when the distance histogram at the target pixel position is generated is determined for each direction that may be determined as the correlation direction.

In step S103 in FIG. 5, the upsampling unit 5 acquires a weighting coefficient of a direction that matches the determined correlation direction among the weighting coefficients for the respective neighboring pixels determined for each direction as described above on the basis of the information regarding the correlation direction of the target pixel position determined in step S102.

In step S104 following step S103, the upsampling unit 5 performs interpolation based on the low-resolution histogram in the vicinity on the basis of the weighting coefficient. That is, by averaging the distance histogram of the neighboring pixel of the target pixel position in the reduced histogram image according to the weighting coefficient for each neighboring pixel acquired in step S103, the distance histogram of the target pixel position is generated. Specifically, regarding the distance histogram of the neighboring pixel, the value of the frequency is averaged according to the weighting coefficient for each bin, and the frequency for each bin obtained by averaging is assumed as the distance histogram of the target pixel position.

Note that the processing in step S104 can be rephrased as processing for generating a distance histogram (high resolution information) in an image space with a high resolution from the reduced histogram image (low-resolution image).

In step S105 following step S104, the upsampling unit 5 determines whether or not all the pixels are processed, that is, whether or not processing from step S101 to step S104 is executed on all the pixel positions in a high-resolution image space. If all the pixels are not processed, the procedure returns to step S101, and if all the pixels are processed, the series of processing illustrated in FIG. 5 is terminated.

Note that, in the above description, the number of neighboring pixels that are referred when the distance histogram of the target pixel position is generated is 2×2=4. However, the number of neighboring pixels can be a number other than four such as 3×3=9.

Furthermore, the weighting coefficient for each direction illustrated in FIGS. 7A and 7B are merely an example for description, and the weighting coefficient is not limited to the illustrated numerical value.

1-3. Interpolation Processing Example II

Figure 8:
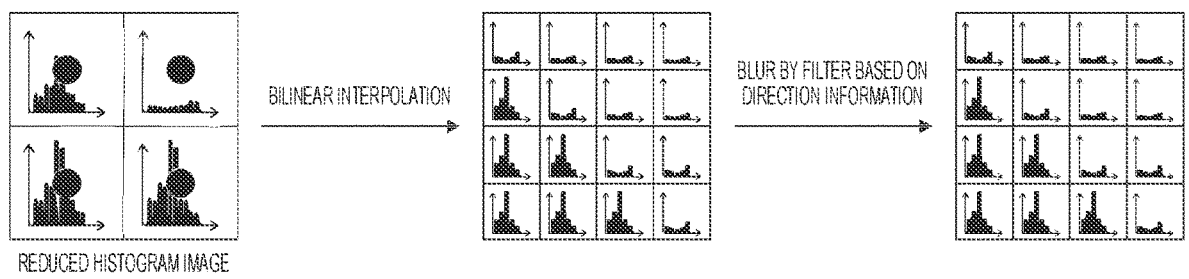
FIG. 8 is an explanatory diagram of an interpolation processing example II.

In the above, as an example of upsampling, an example has been described where the distance histograms of the neighboring pixels of the target pixel position are added according to the weighting coefficients. However, as illustrated in FIG. 8, a method can be adopted for temporarily upsampling a reduced histogram image by the bilinear interpolation method and executing image filter processing based on a correlation direction for each pixel position indicated by high-resolution direction information on a histogram image after upsampling.

Hereinafter, such an interpolation processing example II will be described.

In this case, the upsampling unit 5 obtains information regarding the correlation direction for each target pixel position on the basis of the high resolution luminance information. Here, the information regarding the correlation direction obtained for each target pixel position on the basis of the high resolution luminance information is one form of high-resolution direction information.

Furthermore, the upsampling unit 5 performs upsampling on the reduced histogram image by the bilinear interpolation method. A resolution after upsampling is a same resolution as that of the histogram image generated by the histogram image generation unit 24.

Then, the upsampling unit 5 in this case executes image filter processing using an image filter that has a weight according to the correlation direction for each pixel in the histogram image after upsampling by the bilinear interpolation method.

FIGS. 9A, 9B, 9C, and 9D illustrate an example of an image filter used in the interpolation processing example II.

Figure 9A:
FIGS. 9A, 9B, 9C, and 9D are diagrams illustrating an example of an image filter used in the interpolation processing example II.
Figure 9B:
Figure 9C:
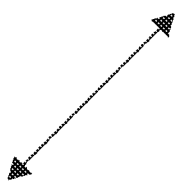
Figure 9D:
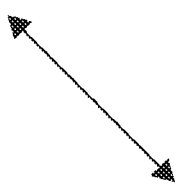

FIG. 9A illustrates an image filter determined for the vertical direction, FIG. 9B illustrates an image filter determined for the horizontal direction, FIG. 9C illustrates an image filter determined for the right oblique direction, and FIG. 9D illustrates an image filter determined for the left oblique direction.

As illustrated, the image filter in this case is a 3×3 image filter centered on the target pixel position. The image filter determined for the vertical direction (FIG. 9A) is a filter of which weighting coefficients of the target pixel position and two pixel positions adjacent to the target pixel position in the vertical direction are "1" and weighting coefficients of other pixel positions are "0". The image filter determined for the horizontal direction (FIG. 9B) is a filter of which weighting coefficients of the target pixel position and two pixel positions adjacent to the target pixel position in the horizontal direction are "1" and weighting coefficients of other pixel positions are "0". Furthermore, the image filter determined for the right oblique direction (FIG. 9C) is a filter on which weighting coefficients of the target pixel position and two pixel positions adjacent to the target pixel position in the right oblique direction are "1" and weighting coefficients of other pixel positions are "0", and the image filter determined for the left oblique direction (FIG. 9D) is a filter of which weighting coefficients of the target pixel position and two pixel positions adjacent to the target pixel position in the left oblique direction are "1" and weighting coefficients of other pixel positions are "0".

The upsampling unit 5 in the interpolation processing example II executes image filter processing using an image filter for a direction that matches a correlation direction determined for a pixel for each pixel on a histogram image upsampled by the bilinear interpolation method. Specifically, regarding 3×3=9 pixels centered on the pixel position to be a target, by averaging the distance histogram of each pixel according to the weighting coefficient of each pixel represented by the image filter, a distance histogram of the pixel to be a target is generated.

By executing the image filter processing described above, a correlation direction in an image plane of a high-resolution histogram image upsampled by the bilinear interpolation method can be corrected so as to approach the correlation direction indicated by the high-resolution direction information.

Therefore, it is possible to obtain an upsampling image in which a correlation in an edge direction is not lost, and it is possible to improve accuracy of distance information indicated by a histogram image. That is, distance measurement performance can be improved.

Note that, although the image filter of 3×3=9 pixels is used in the above, the number of pixels of the image filter is not limited to nine.

1-4. Interpolation Processing Example III

An interpolation processing example III performs upsampling on a reduced histogram image by a joint bilateral filter method using high resolution luminance information.

Here, as a method for improving a resolution of an image with a low resolution on the basis of an image with a high resolution, there is a joint bilateral filter (joint bilateral filter or may be referred to as cross bilateral filter).

The reference 1 below discloses the method. As an application example thereof, an example is indicated in which a low-resolution image of which a class has been corrected, a low-resolution depth image captured by a stereo camera, or the like is upsampled on the basis of a high-resolution color image.

Reference 1: Johannes Kopf, Michael Cohen, Dani Lischinski, Matt Uyttendaele. (2007). "*Joint bilateral upsampling.*" ACM Trans. Graph. 26. 96. 10.1145/1276377.1276497.
(Reference URI: https://www.researchgate.net/publication/220184258_Joint_bilateral_upsampling)

In the interpolation processing example III, such a joint bilateral filter method is applied, and the low-resolution histogram image is upsampled on the basis of high resolution luminance information.

Figure 10:
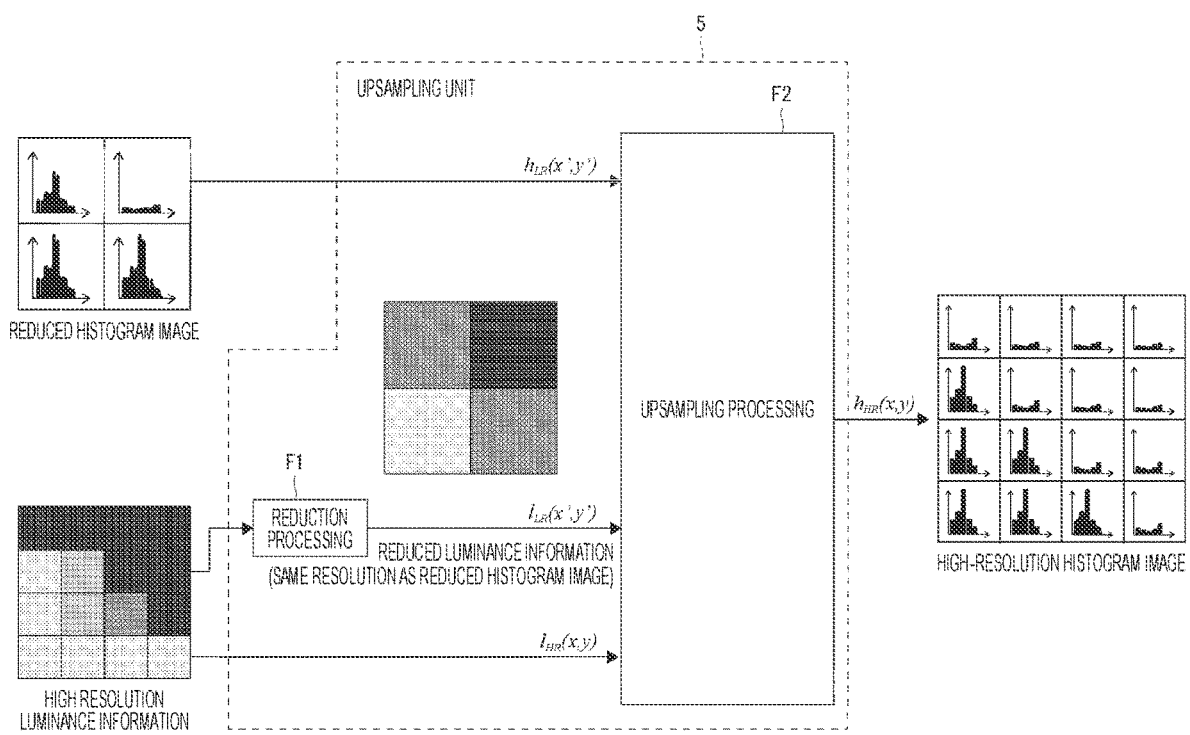
FIG. 10 is an explanatory diagram regarding a method for upsampling a reduced histogram image in an interpolation processing example III.

FIG. 10 is an explanatory diagram regarding a method for upsampling a reduced histogram image in the interpolation processing example III.

As illustrated as reduction processing F1 in FIG. 10, the upsampling unit 5 in this case reduces the high resolution luminance information obtained by the high resolution information generation unit 26 to be the same resolution as the reduced histogram image (low-resolution conversion) and obtains reduced luminance information. Then, as illustrated as upsampling processing F2 in FIG. 10, the upsampling unit 5 performs upsampling on the reduced histogram image by the joint bilateral filter method on the basis of the reduced luminance information obtained according to the reduction processing F1 and the high resolution luminance information obtained by the high resolution information generation unit 26.

Specifically, in the upsampling processing F2, a distance histogram $h_{HR}(x, y)$ of a pixel position (x, y) in a high-resolution image space after upsampling is generated according to the following [Expression 1].

[Formula 1]

$$h_{HR}(x, y) = \frac{\sum_{i,j} h_{LR}(x' + i, y' + j) \cdot \omega[l_{LR}(x' + i, y' + j) - l_{HR}(x, y)] \cdot \varphi(i, j)}{\sum_{i,j} \omega[l_{LR}(x' + i, y' + j) - l_{HR}(x, y)] \cdot \varphi(i, j)}$$ [Expression 1]

In [Expression 1], $l_{LR}$ means the reduced luminance information (reduced luminance image) obtained by the reduction processing F1, and $l_{HR}$ means the high resolution luminance information (high-resolution luminance image). Furthermore, x', y' means a pixel position in the reduced luminance information $l_{LR}$ (that is, same as pixel position in reduced histogram image).

Moreover, $\omega (\Delta l)$ is a weight according to a luminance value difference, and for example, a weight function such as a normal distribution is used. $\varphi (i, j)$ means a weight according to a space direction (weight according to distance in image plane).

Details of [Expression 1] will be described with reference to FIGS. 11A, 11B, and 11C.

For example, an example is indicated in which a distance histogram at a coordinate position (x, y)=(1, 2) in a high-resolution image is estimated.

Figure 11A:
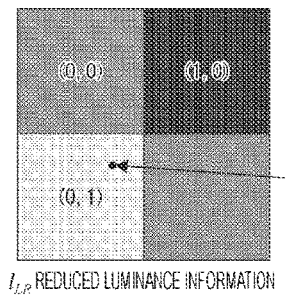
FIGS. 11A, 11B, and 11C are diagrams of [Expression 1] used in the interpolation processing example III.
Figure 11A:
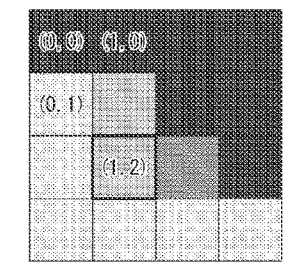

Coordinates in the corresponding low-resolution image are (x', y')=(0.25, 0.75) (refer to FIG. 11A).

In order to refer to low-resolution histograms of four pixels that are neighboring pixels of (x', y') (also in this case, same concept as in interpolation processing example I: refer to FIGS. 7A and 7B), i, j in [Expression 1] are the following values.

(i, j)□(−0.25,−0.75), (0.75,−0.75), (−0.25, 0.25), (0.75, 0.25)=Ω

For example, when (i, j)=(0.75,−0.75), a position of a reduced histogram image of (x'+i, y'+j)=(1, 0) is referred.

Figure 11B:
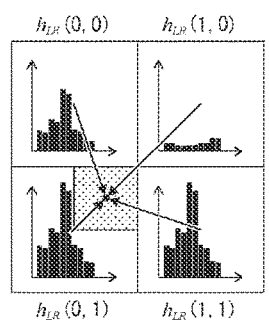

A desired $h_{HR}(x, y)$ is obtained by averaging the low-resolution histograms of these four neighboring pixels (refer to FIG. 11B). According to [Expression 1], 1) The weight increases as being spatially closer, that is, as |i| or |j| is smaller ("$\varphi (i, j)$"). 2) The weight increases as the reduced luminance information of the four neighboring pixels is closer to the value of the high resolution luminance information at the pixel position (x, y) to be obtained ($\omega(\Delta l)$).

Figure 11C:
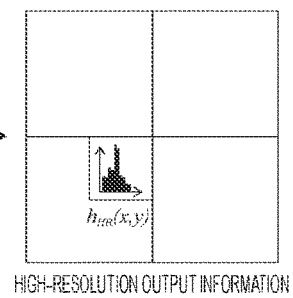

By executing the processing indicated in [Expression 1], it is possible to generate a distance histogram regarding the target pixel position (x, y) in a high-resolution image (refer to "high-resolution output information" in FIG. 11C). In the upsampling processing F2, the processing indicated in [Expression 1] is executed on each pixel position in the high-resolution image space. As a result, upsampling of the reduced histogram image is achieved.

Here, as understood with reference to 1) and 2) described above, it can be said that the upsampling method using the joint bilateral filter is a method for generating the distance histogram of the target pixel position using the weight information determined according to the "distance" with the target pixel position of each neighboring pixel with respect to the target pixel position. Furthermore, at the same time, it can be said that the upsampling method using the joint bilateral filter is a method for generating the distance histogram of the target pixel position using the weight information determined according to the "luminance difference" with the target pixel position of each neighboring pixel with respect to the target pixel position.

Note that the distance histogram of the target pixel position may be generated from the distance histograms of the neighboring pixels using only one of the weight information according to the distance and the weight information according to the luminance difference.

1-5. First Modification of High Resolution Information

Here, in the above description, an example has been described in which the high resolution luminance information obtained by converting the distance histogram into the luminance is used as the high resolution luminance information used to generate the distance histogram of the target pixel position. However, a captured image obtained by imaging an object to be a distance measurement target of a histogram image can be used as the high resolution luminance information.

Figure 12:
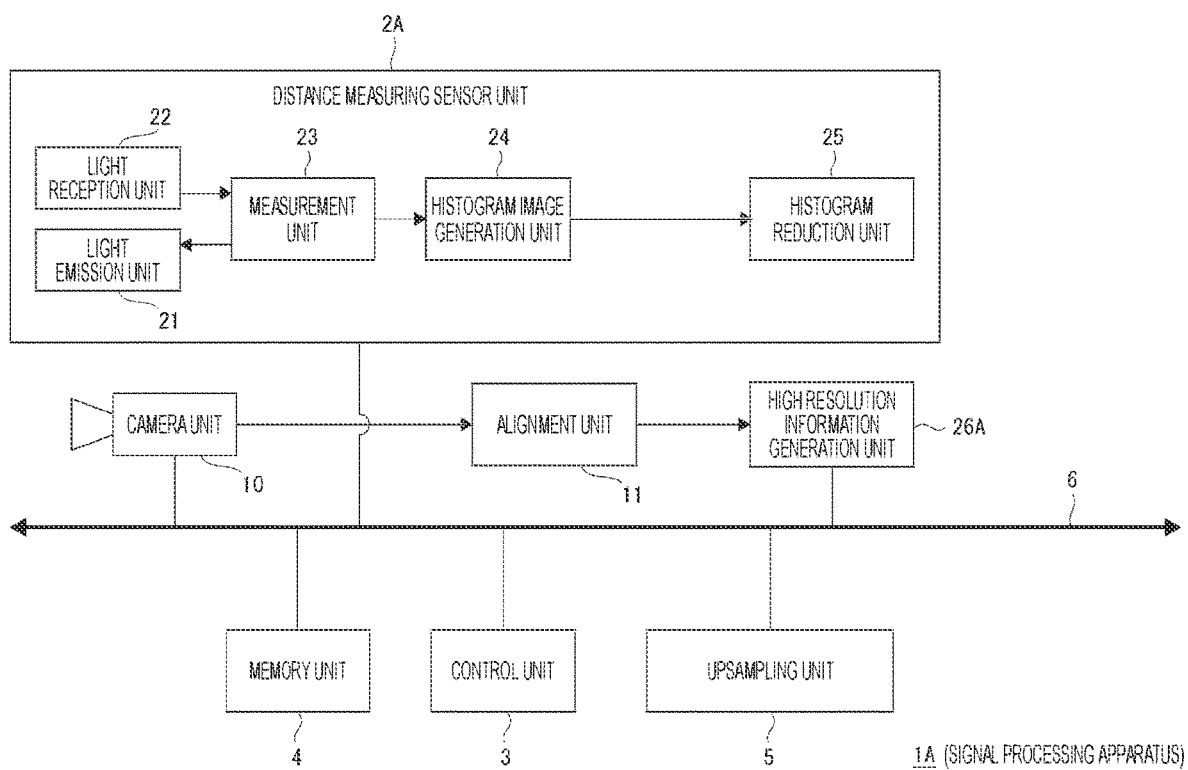
FIG. 12 is a block diagram illustrating an internal configuration example of a signal processing apparatus according to a first modification of the high resolution information.

FIG. 12 is a block diagram illustrating an internal configuration example of a signal processing apparatus 1A as a first modification.

Note that, in the following description, portions similar to portions that have been described are respectively denoted with the same reference numerals, and description thereof will be omitted.

The signal processing apparatus 1A illustrated in FIG. 12 is different from the signal processing apparatus 1 illustrated in FIG. 1 in that a distance measuring sensor unit 2A is provided instead of the distance measuring sensor unit 2 and a camera unit 10, an alignment unit 11, and a high resolution information generation unit 26A are provided.

The distance measuring sensor unit 2A is different from the distance measuring sensor unit 2 in that the high resolution information generation unit 26 is omitted.

The camera unit 10 includes, for example, an image sensor (imaging element) such as a charge coupled device (CCD) sensor or a complementary metal oxide semiconductor (CMOS) sensor and obtains a captured image obtained by imaging an object to be a distance measurement target of a histogram image, in other words, a target object to which the light emission unit 21 emits light and from which the light reception unit 22 receives the reflection light thereof. A resolution of the captured image captured by the camera unit 10 is the same as the resolution of the histogram image obtained by the histogram image generation unit 24.

Here, "imaging" herein means, for example, to capture an image of a subject by a sensor that detects a luminance according to light reception intensity for each pixel, for example, a CCD sensor, a CMOS sensor, or the like. Therefore, an image (depth image) obtained by the sensor that detects the distance for each pixel as the distance measuring sensor unit 2 is not included in a category of the captured image here.

The alignment unit 11 aligns the captured image obtained by the camera unit 10. That is, the captured image is aligned so as to absorb a parallax generated between the histogram image obtained by the distance measuring sensor unit 2A and the captured image of the camera unit 10.

The high resolution information generation unit 26A acquires the captured image by the camera unit 10 that is aligned in this way as high resolution luminance information.

The upsampling unit 5 in this case performs upsampling on a reduced histogram image on the basis of the high resolution luminance information obtained by the high resolution information generation unit 26A. Note that any one of the interpolation processing example I to the interpolation processing example III may be adopted as the upsampling method based on the high resolution luminance information.

Here, it is expected that the captured image obtained by the camera unit 10 has a higher SNR as compared with the histogram image obtained by the histogram image generation unit 24 (high-resolution histogram image). Therefore, by performing upsampling on the reduced histogram image on the basis of the high resolution luminance information as the captured image as described above, it is possible to improve the accuracy of the distance information indicated by the histogram image, and it is possible to improve the distance measurement performance.

1-6. Second Modification of High Resolution Information

In the above description, an example has been described in which a correlation direction is determined on the basis of a luminance image. However, the correlation direction can be determined on the basis of a histogram image. A specific method will be described with reference to FIGS. 13, 14A, and 14B.

Figure 13:
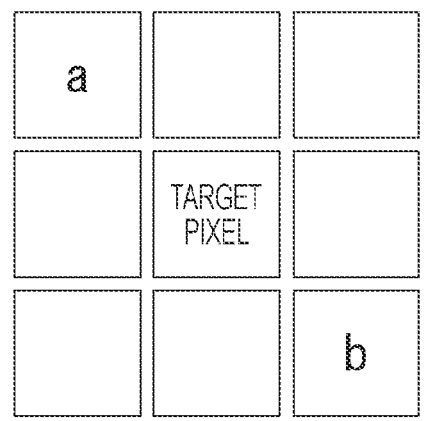
FIG. 13 is a diagram for explaining an example of correlation calculation in a second modification of the high resolution information.

FIG. 13 schematically illustrates 3×3=9 pixels centered on a target pixel position in a histogram image as a high-resolution image obtained by the histogram image generation unit 24.

Here, an example is described in which correlation calculation in the right oblique direction is performed using distance histograms of two pixels, adjacent to the target pixel position in the right oblique direction, respectively indicated by "a" and "n" in FIG. 13.

Also in this case, the SAD and the SSD can be used for correlation calculation.

Figure 14A:
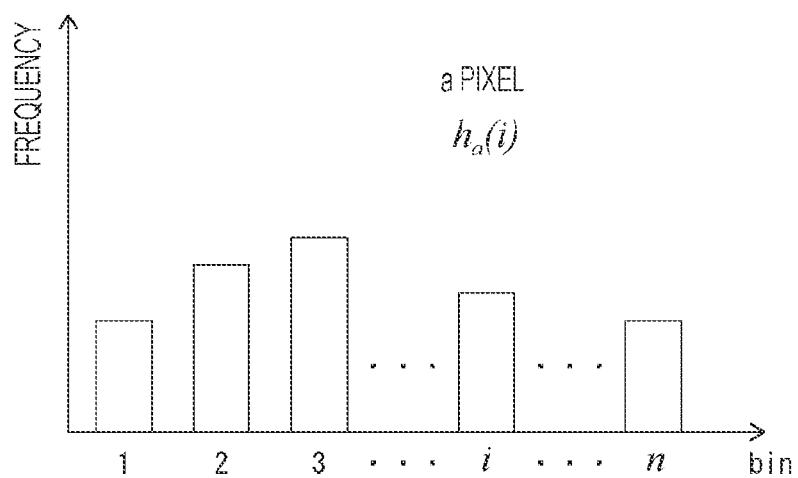
FIGS. 14A and 14B are diagrams for explaining an example of the correlation calculation in the second modification of the high resolution information together with FIG. 13.
Figure 14B:
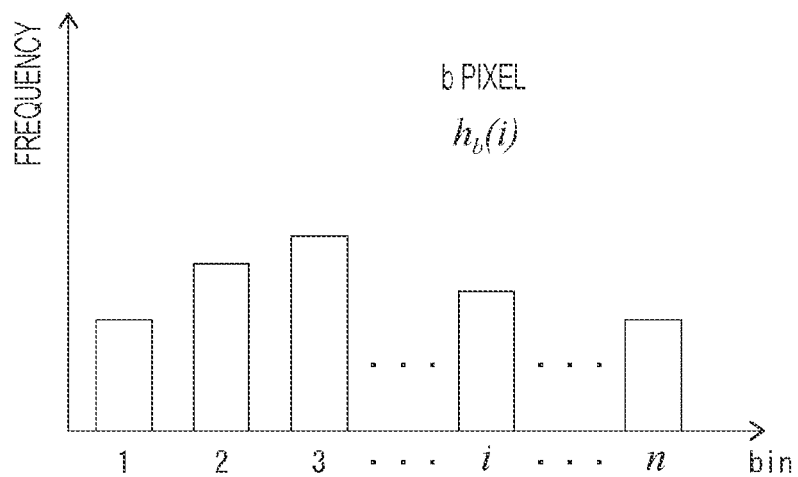

As illustrated in FIGS. 14A and 14B, a frequency of bin (i) in the distance histogram of the "a" pixel is indicated as $h_a$ (i), and a frequency of bin (i) in the distance histogram of the "b" pixel is indicated as $h_b$ (i) (however, i is natural number of one to n).

An expression for obtaining a correlation between the "a" and "b" pixels by the SAD is expressed by the following [Expression 2], and an expression for obtaining the same correlation by the SSD is expressed by the following [Expression 3].

[Formula 2]

$$SAD = \sum_{i=0}^{n} |ha(i) - hb(i)| \qquad \text{[Expression 2]}$$

[Formula 3]

$$SAD = \sum_{i=0}^{n} (ha(i) - hb(i))^2 \qquad \text{[Expression 3]}$$

When the correlation direction is determined in this case, regarding not only the right oblique direction illustrated in FIG. 13 but also each of the vertical direction, the horizontal direction, and the left oblique direction, the similar correlation calculation is performed. Then, for each pixel position of the histogram image as a high-resolution image, the correlation direction is determined from the result of performing such correlation calculation for four directions, and high-resolution direction information in which information regarding the correlation direction is allocated to each pixel position is obtained.

Note that the processing for generating the high-resolution direction information by determining the correlation direction on the basis of the histogram image as described above is executed by the high resolution information generation unit 26 illustrated in FIG. 1. In this case, it goes without saying that the upsampling unit 5 can omit the processing for determining the correlation direction on the basis of the high resolution luminance information.

Note that, although only the SAD and the SSD are exemplified as examples of the correlation calculation above, the NCC and the ZNCC can be used for the correlation calculation in this case.

2. Second Embodiment

In a second embodiment, the distance histogram interpolation method described above is applied to interpolate a defective pixel.

Figure 15:
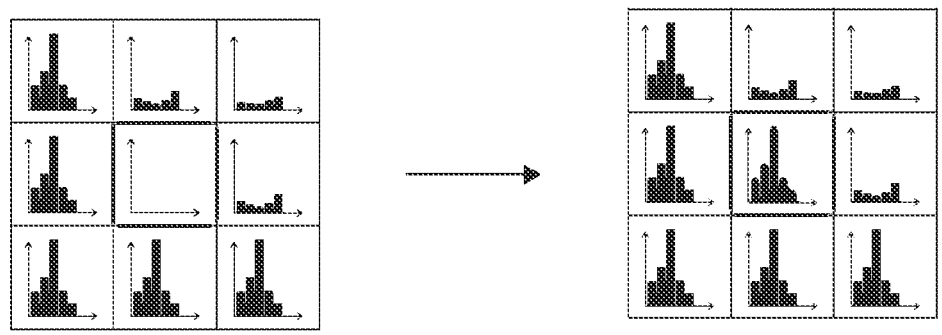
FIG. 15 is a diagram illustrating an image of interpolation of a defective pixel in a histogram image.

FIG. 15 illustrates an image of interpolation of a defective pixel in a histogram image.

Figure 16:
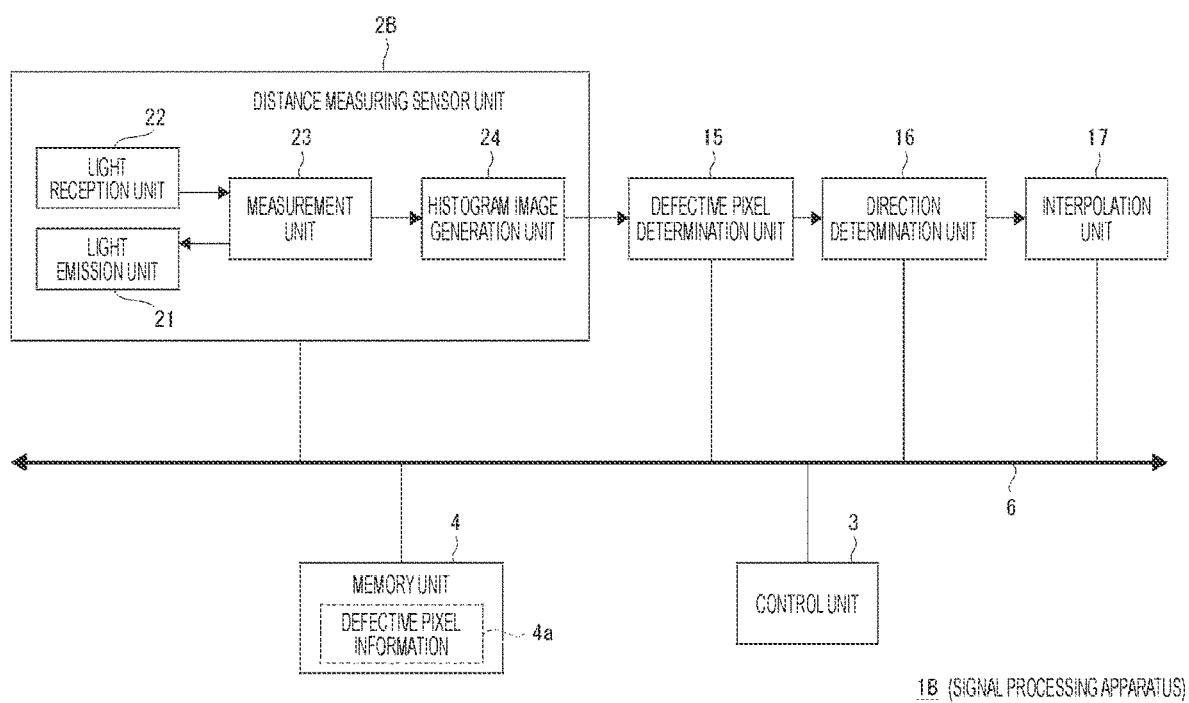
FIG. 16 is a block diagram illustrating an internal configuration example of a signal processing apparatus as a second embodiment.

FIG. 16 is a block diagram illustrating an internal configuration example of a signal processing apparatus 1B as the second embodiment.

A difference from the signal processing apparatus 1 illustrated in FIG. 1 is that a distance measuring sensor unit 2B is provided instead of the distance measuring sensor unit 2, the upsampling unit 5 is omitted, and a defective pixel determination unit 15, a direction determination unit 16, and an interpolation unit 17 are provided. The defective pixel determination unit 15, the direction determination unit 16, and the interpolation unit 17 are connected to a bus 6 as illustrated and can perform data communication with each unit connected via the bus 6.

The distance measuring sensor unit 2B is different from the distance measuring sensor unit 2 in that the histogram reduction unit 25 and the high resolution information generation unit 26 are omitted.

The defective pixel determination unit 15 inputs a histogram image output from a histogram image generation unit 24 in the distance measuring sensor unit 2B and determines whether or not a pixel is a defective pixel for each pixel. Various methods can be considered as the method for determining the defective pixel.

As an example, a method can be exemplified for determining whether or not a sum of frequencies of a distance histogram is abnormally large or small, specifically, whether or not the sum is equal to or more than an upper limit threshold or equal to or less than a lower limit threshold.

Alternatively, a method can be used for determining whether or not a value of a frequency of a specific bin in the distance histogram is maintained to be a certain value (or maintained to be a value within a certain range) for a predetermined time or longer with reference to a histogram image input in the past.

Alternatively, a method can be exemplified for determining whether or not a correlation value with respect to a distance histogram of a plurality of surrounding pixels is significantly small (equal to or less than predetermined value).

Alternatively, a method can be used for determining whether or not a distance histogram (for example, frequency for each bin, sum of frequencies, or the like) is randomly changed in a time axis direction and dependency on a scene or a correlation with a change in the distance histograms of the plurality of surrounding pixels is low.

In a case where a pixel is determined as a defective pixel, the defective pixel determination unit 15 outputs information indicating a pixel position of the defective pixel to the direction determination unit 16 as defective pixel information.

The direction determination unit 16 inputs the histogram image from the histogram image generation unit 24 via the defective pixel determination unit 15 and determines a correlation direction of the defective pixel specified according to the defective pixel information from the defective pixel determination unit 15 in the histogram image. Note that, the method for determining the correlation direction of the target pixel position in the histogram image has been described [1-6. Second Modification of High Resolution Information] (refer to FIGS. 13, 14A, and 14B), and accordingly, overlapped description will be avoided. The direction determination unit 16 outputs information regarding the correlation direction determined for the defective pixel to the interpolation unit 17.

The interpolation unit 17 inputs the histogram image from the histogram image generation unit 24 and the defective pixel information obtained by the defective pixel determination unit 15 via the direction determination unit 16 and interpolates a distance histogram of the defective pixel in the histogram image on the basis of the correlation direction of the defective pixel determined by the direction determination unit 16.

The interpolation in this case is different from the interpolation at the time of upsampling, and a weighting coefficient determined for each neighboring pixel of eight surrounding pixels excluding the defective pixel among 3×3=9 pixels centered on the defective pixel is used as a weighting coefficient for each correlation direction.

As defective pixel interpolation processing, the interpolation unit 17 first executes processing for acquiring a weighting coefficient in a direction that matches the correlation direction of the defective pixel regarding the weighting coefficient for each neighboring pixel as such eight surrounding pixels. Then, the distance histograms of the respective neighboring pixels of the defective pixel are averaged according to the acquired weighting coefficient for each neighboring pixel.

As a result, the distance histogram of the defective pixel can be appropriately interpolated on the basis of the distance histograms of the surrounding pixels.

Here, there is a case where a defective pixel is found at the time of inspection performed before shipment of a product. In such a case, pixel position information regarding the defective pixel found in the inspection is stored in a memory unit 4 as defective pixel information 4a.

In this case, the direction determination unit 16 determines a correlation direction for a pixel at a position indicated by such defective pixel information 4a, and the interpolation unit 17 interpolates the pixel at the position indicated by the defective pixel information 4a on the basis of distance histograms of surrounding pixels.

Note that, in the above, an example has been described in which the correlation direction for the defective pixel is determined on the basis of the correlation calculation result of the distance histogram. However, the correlation direction may be determined from a correlation calculation result of a luminance as in the interpolation processing example I described above. In this case, the direction determination unit 16 converts the histogram image from the histogram image generation unit 24 into a luminance image, performs correlation calculation on the basis of the luminance image, and determines a correlation direction on the basis of the correlation calculation result.

Furthermore, in the above, an example has been described in which the correlation direction for the defective pixel is determined on the basis of the histogram image. However, it is possible to determine a correlation direction for a defective pixel on the basis of the captured image obtained by the camera unit 10 as in [1-5. First Modification of High Resolution Information] (refer to FIG. 12) described above.

Figure 17:
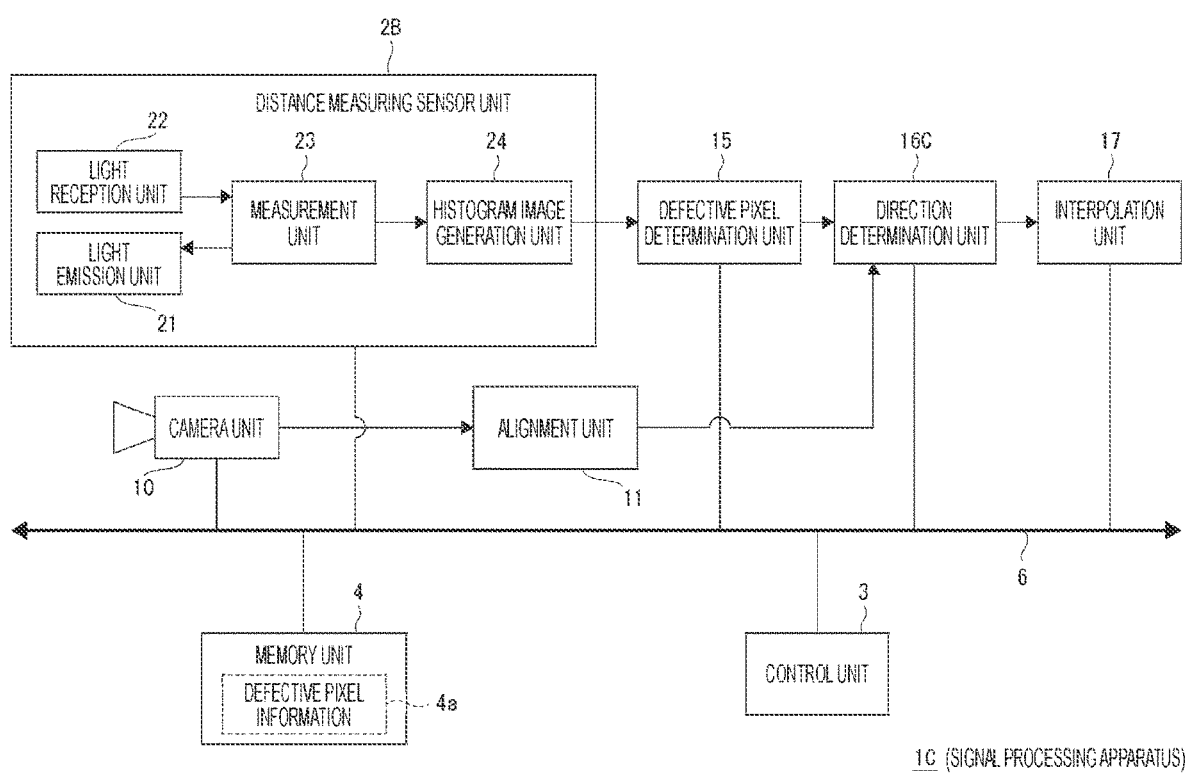
FIG. 17 is a block diagram illustrating an internal configuration example of a signal processing apparatus as a modification of the second embodiment.

FIG. 17 is a block diagram illustrating an internal configuration example of a signal processing apparatus 1C as a modification that determines a correlation direction for a defective pixel on the basis of a captured image in this way.

A difference from the signal processing apparatus 1B illustrated in FIG. 16 is that the camera unit 10 and an alignment unit 11 are added and a direction determination unit 16C is provided instead of the direction determination unit 16.

As illustrated, a captured image obtained by the camera unit 10 is input to the direction determination unit 16C through alignment processing by the alignment unit 11. The direction determination unit 16C performs correlation calculation for a pixel position of a defective pixel and determines a correlation direction on the basis of the correlation calculation result on the basis of such a captured image input via the alignment unit 11.

As a result, the determination accuracy of the correlation direction can be improved as compared with a case of performing the correlation direction determination based on the histogram image, the accuracy of the distance information represented by the histogram image can be improved, and the distance measurement performance can be improved.

3. Modification

Note that the embodiment is not limited to the specific examples described above, and various modifications can be adopted.

For example, in the above, regarding the first embodiment, a configuration has been described in which the histogram image generation unit 24, the histogram reduction unit 25, and the high resolution information generation unit 26 are mounted on the same substrate where the light reception unit 22 and the light emission unit 21 are mounted. However, a configuration may be adopted in which some or all of the histogram image generation unit 24, the histogram reduction unit 25, and the high resolution information generation unit 26 are mounted outside the substrate where the light reception unit 22 and the light emission unit 21 are mounted.

Alternatively, a configuration can be used in which the upsampling unit 5 is provided on the same substrate as the distance measuring sensor unit 2 illustrated in FIG. 1.

4. Summary of Embodiments

As described above, the signal processing apparatus (1, 1A, 1B, 1C) as the embodiment includes a histogram generation unit (upsampling unit 5 or interpolation unit 17) that inputs the histogram image in which the distance histogram indicating the results of the plurality of times of distance measurement as frequency information is allocated to each pixel position and generates the distance histogram of the interpolation target position in the histogram image on the basis of the distance histograms of the plurality of pixel positions near the interpolation target position.

By interpolating the distance histogram on the basis of the distance histogram in this way, it is possible to improve accuracy of the interpolation.

Therefore, pixel interpolation can be appropriately performed regarding a histogram image.

Furthermore, in the signal processing apparatus as the embodiment, the histogram generation unit acquires the information regarding the correlation direction that is the direction determined from the result of image correlation calculation performed for the plurality of directions in an image plane with reference to the interpolation target position and generates a distance histogram of the interpolation target position using the weight information for each pixel position near the interpolation target position determined according to the correlation direction.

By generating the distance histogram of the interpolation target position using the weight information of each neighboring pixel according to the correlation direction in this way, it is possible to prevent that an image correlation in an edge direction is broken by the interpolated distance histogram.

Therefore, it is possible to improve the accuracy of the distance information indicated by the interpolated distance histogram, and it is possible to improve the distance measurement performance.

Moreover, in the signal processing apparatus as the embodiment, the histogram generation unit generates the histogram of the interpolation target position by averaging the distance histograms of the plurality of pixel positions near the interpolation target position according to weighting based on the weight information for each pixel position.

As a result, it is possible to appropriately generate the distance histogram of the interpolation target position on the basis of the weight information according to the correlation direction.

Therefore, it is possible to improve the accuracy of the distance information indicated by the interpolated distance histogram, and it is possible to improve the distance measurement performance.

Moreover, in the signal processing apparatus as the embodiment, the histogram generation unit generates the distance histogram of the interpolation target position using the weight information determined according to the distance between each pixel position near the interpolation target position and the interpolation target position.

As a result, it is possible to appropriately generate the distance histogram of the interpolation target position on the basis of the weight information according to the distance between the interpolation target position and the neighboring pixel.

Therefore, it is possible to improve the accuracy of the distance information indicated by the interpolated distance histogram, and it is possible to improve the distance measurement performance.

Furthermore, in the signal processing apparatus as the embodiment, the histogram generation unit generates the distance histogram of the interpolation target position using the weight information determined according to the luminance difference between each pixel position near the interpolation target position and the interpolation target position.

As a result, it is possible to appropriately generate the distance histogram of the interpolation target position on the basis of the weight information according to the luminance difference between the interpolation target position and the neighboring pixel.

Therefore, it is possible to improve the accuracy of the distance information indicated by the interpolated distance histogram, and it is possible to improve the distance measurement performance.

Moreover, in the signal processing apparatus as the embodiment, the histogram generation unit generates the distance histogram of the interpolation target position using the weight information determined according to the distance with the interpolation target position for each pixel position near the interpolation target position and the weight information determined according to the luminance difference from the interpolation target position for each pixel position near the interpolation target position.

As a result, it is possible to appropriately generate the distance histogram of the interpolation target position on the basis of both of the weight information according to the distance from the interpolation target position and the weight information according to the luminance difference from the interpolation target position.

Therefore, it is possible to improve the accuracy of the distance information indicated by the interpolated distance histogram, and it is possible to improve the distance measurement performance.

Moreover, in the signal processing apparatus (1 or 1A) as the embodiment, the histogram image input by the histogram generation unit (upsampling unit 5) is a reduced histogram image obtained by performing low-resolution conversion on the original histogram image, and the histogram generation unit inputs the high resolution information that is information with a higher resolution than the reduced histogram image and is information in which information other than the distance histogram is allocated to each pixel position and generates a histogram image with a higher resolution than the reduced histogram image on the basis of the high resolution information and the reduced histogram image.

The reduced histogram image described above has a data amount less than the original histogram image with a high resolution, and the high resolution information is the information in which the information other than the distance histogram is allocated to each pixel position. Therefore, the high resolution information can be information having a data amount less than a histogram image. That is, the data amount of both of the reduced histogram image and the high resolution information can be less than the data amount of the original histogram image with a high resolution. Then, according to the configuration described above, the reduced histogram image is upsampled to the histogram image with a high resolution on the basis of the reduced histogram image and the high resolution information. Therefore, when a histogram image with a predetermined resolution is transmitted, a transmission data amount can be reduced than that in a case where the original histogram image with a high resolution is transmitted as it is.

Therefore, when a transmission source makes a transmission destination acquire the histogram image with the predetermined resolution, it is possible to reduce a bandwidth of a transmission path.

Furthermore, in the signal processing apparatus as the embodiment, the histogram generation unit inputs the reduced histogram image generated by low-resolution conversion performed by adding the distance histogram between the adjacent pixels to the original histogram image.

As a result, the distance histogram can be interpolated on the basis of the reduced histogram image having a higher SNR than the original histogram image.

Therefore, it is possible to improve the accuracy of the distance information indicated by the histogram image after upsampling, and it is possible to improve the distance measurement performance.

Moreover, in the signal processing apparatus as the embodiment, the high resolution information is the high resolution luminance information of which the distance histogram of each pixel position of the original histogram image is converted into the luminance.

It is possible to appropriately determine the correlation direction regarding the interpolation target position and calculate the luminance difference between the interpolation target position and the neighboring pixel position on the basis of such high resolution luminance information.

Therefore, it is possible to appropriately perform upsampling of the reduced histogram image.

Furthermore, because a data amount of the luminance can be smaller than a data amount of the distance histogram, it is possible to reduce the bandwidth of the transmission path.

Moreover, in the signal processing apparatus as the embodiment, the high resolution luminance information is information in which a value based on the sum of the frequencies of the respective distances of the distance histogram is allocated to each pixel position of the original histogram image.

A sum of frequencies of respective distances of a distance histogram obtained regarding a certain pixel position is information corresponding to a luminance of the pixel position.

Therefore, it is possible to appropriately determine the correlation direction regarding the interpolation target position on the basis of the high resolution luminance information and calculate the luminance difference between the interpolation target position and the neighboring pixel position, and it is possible to appropriately perform upsampling of the reduced histogram image.

Furthermore, in the signal processing apparatus as the embodiment, the high resolution information is high-resolution direction information in which information regarding the correlation direction that is the direction determined for each pixel position from the result of image correlation calculation performed for the plurality of directions in the image plane for each pixel position of the original histogram image is allocated to each pixel position.

As a result, when upsampling is performed on the reduced histogram image, it is not needed for an input side of the reduced histogram image to calculate an image correlation in order to determine the correlation direction.

Therefore, it is possible to reduce a processing load required for the upsampling processing.

Furthermore, in this case, the correlation direction for each pixel position is determined from the result of calculating the correlation between the distance histograms. Therefore, it is possible to improve accuracy of the correlation direction in comparison with a case where the correlation direction is determined on the basis of conversion information from the distance histogram, such as a case where the correlation direction is determined on the basis of the luminance converted from the distance histogram.

Moreover, in the signal processing apparatus as the embodiment, the histogram generation unit performs upsampling on the reduced histogram image by the bilinear interpolation method and executes the image filter processing based on the correlation direction for each pixel position indicated by the high-resolution direction information on the upsampled histogram image.

As a result, regarding the high-resolution histogram image obtained by upsampling by the bilinear interpolation method, it is possible to blur the distance histogram in the edge direction through the image filter processing based on the correlation direction.

Therefore, it is possible to obtain an upsampling image in which a correlation in an edge direction is not lost, and it is possible to improve accuracy of distance information indicated by a histogram image. That is, distance measurement performance can be improved.

Moreover, in the signal processing apparatus as the embodiment, the histogram generation unit (interpolation unit 17) inputs the histogram image generated on the basis of the reception signal from the light reception unit (22) in which the pixels having the multiple light reception elements are two-dimensionally arranged as a histogram image, and generates the distance histogram of the pixel position of the defective pixel in the input histogram image on the basis of the distance histogram of the plurality of pixel positions positioned near the pixel position of the defective pixel in the histogram image.

As a result, even in a case where some pixels in the light reception unit have a defect, the distance histogram of the defective pixel is interpolated on the basis of the distance histogram of the neighboring pixel.

Therefore, use of the light reception unit having the defective pixel can be permitted, and it is possible to improve a yield.

Furthermore, in the signal processing apparatus as the embodiment, the histogram generation unit (upsampling unit 5 or interpolation unit 17) generates the distance histogram of the interpolation target position from the distance histograms of the plurality of pixel positions near the interpolation target position on the basis of the captured image obtained by imaging the object to be a distance measurement target of the input histogram image.

As a result, it is possible to use the captured image with a higher SNR than a distance image as a reference image used when the distance histogram of the interpolation target position is generated from the distance histogram of the neighboring pixel.

Therefore, by interpolating the distance histogram on the basis of the accurate reference image, it is possible to improve the accuracy of the distance information indicated by the histogram image, and it is possible to improve the distance measurement performance.

Moreover, in the signal processing apparatus as the embodiment, the histogram generation unit acquires the information regarding the correlation direction determined from the result of the image correlation calculation with respect to the captured image obtained by imaging the object to be a distance measurement target of the input histogram image, as the information regarding the correlation direction.

As a result, it is possible to use the information regarding the correlation direction obtained from the captured image with a higher SNR than the distance image as the information regarding the correlation direction used to interpolate the distance histogram.

Therefore, it is possible to interpolate the distance histogram based on the correlation direction information with higher reliability, and the accuracy of the distance information indicated by the histogram image is improved, and it is possible to improve the distance measurement performance.

Furthermore, the signal processing method as the embodiment is a signal processing method for inputting the histogram image in which the distance histogram indicating the results of the plurality of times of distance measurement as frequency information for each distance is allocated to each pixel position and generating the distance histogram of the interpolation target position in the histogram image on the basis of the distance histograms of the plurality of pixel positions near the interpolation target position.

According to such a signal processing method as the embodiment, actions and effects similar to those of the signal processing apparatus as the embodiment described above can be obtained.

Note that the effects described in the present specification are only exemplary and not limited to these. Furthermore, there may be an additional effect.

5. Present Technology

Note that the present technology can have the following configurations.

(1)

A signal processing apparatus including:

a histogram generation unit configured to input a histogram image in which a distance histogram indicating results of a plurality of times of distance measurement as frequency information for each distance is allocated to each pixel position and generate a distance histogram of an interpolation target position in the histogram image on a basis of distance histograms of a plurality of pixel positions near the interpolation target position.

(2)

The signal processing apparatus according to (1), in which the histogram generation unit acquires information regarding a correlation direction that is a direction determined from a result of image correlation calculation performed for a plurality of directions in an image plane with reference to the interpolation target position and generates the distance histogram of the interpolation target position using weight information for each pixel position near the interpolation target position determined according to the correlation direction.

(3)

The signal processing apparatus according to (2), in which the histogram generation unit generates a histogram of the interpolation target position by averaging the distance histograms of the plurality of pixel positions near the interpolation target position by weighting based on the weight information for each pixel position.

(4)

The signal processing apparatus according to any one of (1) to (3), in which the histogram generation unit generates the distance histogram of the interpolation target position using weight information determined according to a distance from the interpolation target position for each pixel position near the interpolation target position.

(5)

The signal processing apparatus according to any one of (1) to (3), in which the histogram generation unit generates the distance histogram of the interpolation target position using weight information determined according to a luminance difference from the interpolation target position for each pixel position near the interpolation target position.

(6)

The signal processing apparatus according to any one of (1) to (4), in which
the histogram generation unit
generates the distance histogram of the interpolation target position using the weight information determined according to the distance from the interpolation target position for each pixel position near the interpolation target position and weight information determined according to a luminance difference from the interpolation target position for each pixel position near the interpolation target position.

(7)

The signal processing apparatus according to any one of (1) to (6), in which
a histogram image input by the histogram generation unit is a reduced histogram image obtained by performing low-resolution conversion on an original histogram image, and
the histogram generation unit
inputs high resolution information that is information with a higher resolution than the reduced histogram image and is information in which information other than a distance histogram is allocated for each pixel position and generates a histogram image with a higher resolution than the reduced histogram image on a basis of the high resolution information and the reduced histogram image.

(8)

The signal processing apparatus according to (7), in which
the histogram generation unit
inputs the reduced histogram image generated by performing the low-resolution conversion performed by adding a distance histogram between adjacent pixels in the original histogram image.

(9)

The signal processing apparatus according to (7) or (8), in which
the high resolution information is
high resolution luminance information of which a distance histogram of each pixel position of the original histogram image is converted into a luminance.

(10)

The signal processing apparatus according to (9), in which
the high resolution luminance information is
information in which a value based on a sum of frequencies of respective distances of a distance histogram is allocated to each pixel position of the original histogram image.

(11)

The signal processing apparatus according to (7) or (8), in which
the high resolution information is
high-resolution direction information in which information regarding a correlation direction that is a direction determined for each pixel position from a result of image correlation calculation performed for a plurality of directions in an image plane for each pixel position of the original histogram image is allocated to each pixel position.

(12)

The signal processing apparatus according to (11), in which
the histogram generation unit
performs upsampling on the reduced histogram image by a bilinear interpolation method and executes image filter processing based on the correlation direction for each pixel position indicated by the high-resolution direction information on the upsampled histogram image.

(13)

The signal processing apparatus according to any one of (1) to (12), in which
the histogram generation unit
inputs a histogram image generated on a basis of a reception signal from a light reception unit in which a plurality of pixels having a light reception element is two-dimensionally arranged as the histogram image and
generates a distance histogram of a pixel position of a defective pixel in the input histogram image on a basis of distance histograms of a plurality of pixel positions positioned near the pixel position of the defective pixel in the histogram image.

(14)

The signal processing apparatus according to any one of (1) to (13), in which
the histogram generation unit
generates the distance histogram of the interpolation target position from the distance histograms of the plurality of pixel positions near the interpolation target position on a basis of a captured image obtained by imaging an object to be a distance measurement target of the input histogram image.

(15)

The signal processing apparatus according to (2), in which
the histogram generation unit
acquires information regarding the correlation direction determined from a result of the image correlation calculation with respect to a captured image obtained by imaging an object to be a distance measurement target of the input histogram image as information regarding the correlation direction.

REFERENCE SIGNS LIST 1, 1A, 1B, 1C Signal processing apparatus
2, 2A, 2B Distance measuring sensor unit
21 Light emission unit
22 Light reception unit
23 Measurement unit
24 Histogram image generation unit
25 Histogram reduction unit
26, 26A High resolution information generation unit
3 Control unit
4 Memory unit
4a Defective pixel information
5 Upsampling unit
6 Bus
10 Camera unit
11 Alignment unit
15 Defective pixel determination unit
16, 16C Direction determination unit
17 Interpolation unit

The invention claimed is:

1. A signal processing apparatus, comprising:
a histogram generation unit configured to:
generate a first histogram image that includes a plurality of first distance histograms, wherein
each first distance histogram of the plurality of first distance histograms is associated with a respective pixel position of a plurality of pixel positions of the first histogram image,
each first distance histogram of the plurality of first distance histograms indicates, as frequency information for each first distance of a plurality of first distances, a plurality of results of a plurality of times of a distance measurement, and
the plurality of pixel positions includes:
an interpolation target position, and
a first set of pixel positions that surrounds the interpolation target position;
execute, based on the interpolation target position, an image correlation calculation for a plurality of directions in an image plane;
determine a direction of the plurality of directions based on the execution of the image correlation calculation;
acquire information regarding a correlation direction, wherein the correlation direction corresponds to the determined direction;
determine, based on the information regarding the correlation direction, first weight information for each pixel position of the first set of pixel positions; and
generate a second distance histogram of the interpolation target position of the first histogram image based on the determined first weight information.

2. The signal processing apparatus according to claim 1, wherein
the plurality of first distance histograms includes a set of first distance histograms,
the set of first distance histograms is associated with the first set of pixel positions, and
the histogram generation unit is further configured to:
weight the set of first distance histograms based on the determined first weight information;
determine an average of the weighted set of first distance histograms; and
generate the second distance histogram of the interpolation target position based on the determined average.

3. The signal processing apparatus according to claim 1, wherein the histogram generation unit is further configured to:
determine second weight information based on a second distance from the interpolation target position to each pixel position of the first set of pixel positions; and
generate the second distance histogram of the interpolation target position based on the determined second weight information.

4. The signal processing apparatus according to claim 1, wherein the histogram generation unit is further configured to:
determine second weight information based on a luminance difference between the interpolation target position and each pixel position of the first set of pixel positions; and
generate the second distance histogram of the interpolation target position based on the determined second weight information.

5. The signal processing apparatus according to claim 1, wherein the histogram generation unit is further configured to:
determine second weight information based on a second distance from the interpolation target position to each pixel position of the first set of pixel positions;
determine third weight information based on a luminance difference between the interpolation target position and each pixel position of the first set of pixel positions; and
generate the second distance histogram of the interpolation target position based on each of the determined second weight information and the determined third weight information.

6. The signal processing apparatus according to claim 1, further comprising:
a histogram reduction unit configured to execute a low-resolution conversion on the first histogram image, wherein the low-resolution conversion is executed to obtain a reduced histogram image; and
a high resolution information generation unit configured to generate high resolution information that has a higher resolution than the reduced histogram image, wherein
the high resolution information includes information different from the plurality of first distance histograms,
the information is associated with each pixel position of the plurality of pixel positions, and
the histogram generation unit is further configured to generate second histogram image, with a higher resolution than the reduced histogram image, based on each of the high resolution information and the reduced histogram image.

7. The signal processing apparatus according to claim 6, wherein
the histogram reduction unit is further configured to add, based on the execution of the low-resolution conversion, a set of first distance histograms of the plurality of first distance histograms,
the set of first distance histograms is added to obtain the reduced histogram image, and
the set of first distance histograms is associated with a second set of adjacent pixel positions of the plurality of pixel positions of the first histogram image.

8. The signal processing apparatus according to claim 6, wherein
the high resolution information is high resolution luminance information,
the high resolution information generation unit is further configured to convert each first distance histogram of the plurality of first distance histograms into a luminance, and
the high resolution luminance information includes the luminance.

9. The signal processing apparatus according to claim 8, wherein
the high resolution information generation unit is further configured to determine a value for each pixel position of the plurality of pixel positions,
the value of each pixel position of the plurality of pixel positions is determined based on a sum of frequencies of the plurality of first distances of a corresponding first distance histogram of the plurality of first distance histograms, and
the high resolution luminance information includes the determined value of each pixel position of the plurality of pixel positions.

10. The signal processing apparatus according to claim 6, wherein
  the high resolution information is high-resolution direction information, and
  the high-resolution direction information includes the acquired information regarding the correlation direction for each pixel position of the plurality of pixel positions.

11. The signal processing apparatus according to claim 10, wherein the histogram generation unit is further configured to:
  execute an upsampling process on the reduced histogram image by a bilinear interpolation method, wherein the upsampling process is executed to obtain an unsampled histogram image; and
  execute, based on the correlation direction of each pixel position of the plurality of pixel positions, an image filter process on the upsampled histogram image.

12. The signal processing apparatus according to claim 1, further comprising a light reception unit that includes a plurality of pixels, wherein
  the plurality of pixels includes a light reception element in a two-dimensional arrangement,
  the plurality of pixels includes a defective pixel,
  the plurality of pixel positions includes:
    a pixel position of the defective pixel, and
    a second set of pixel positions that surrounds the pixel position of the defective pixel,
  the plurality of first distance histograms includes a set of first distance histograms,
  the set of first distance histograms is associated with the second set of pixel positions, and
  the histogram generation unit is further configured to:
    receive a reception signal from the light reception unit;
    generate the first histogram image based on the reception signal; and
    generate a third distance histogram of the pixel position of the defective pixel based on the set of first distance histograms.

13. The signal processing apparatus according to claim 1, further comprising an image sensor configured to capture an image of an object, wherein
  the object corresponds to a distance measurement target of the first histogram image,
  the plurality of first distance histograms includes a set of first distance histograms,
  the set of first distance histograms is associated with the first set of pixel positions, and
  the histogram generation unit is further configured to generate the second distance histogram of the interpolation target position based on each of:
    the set of first distance histograms, and
    the captured image.

14. The signal processing apparatus according to claim 1, further comprising an image sensor configured to capture an image of an object, wherein
  the object corresponds to a distance measurement target of the first histogram image, and
  the histogram generation unit is further configured to:
    execute, based on the captured image, the image correlation calculation; and
    acquire the information regarding the correlation direction based on the execution of the image correlation calculation.

15. A signal processing method, comprising:
  generating a histogram image that includes a plurality of first distance histograms, wherein
    each first distance histogram of the plurality of first distance histograms is associated with a respective pixel position of a plurality of pixel positions of the histogram image,
    each first distance histogram of the plurality of first distance histograms indicates, as frequency information for each distance of a plurality of distances, a plurality of results of a plurality of times of a distance measurement, and
    the plurality of pixel positions includes:
      an interpolation target position, and
      a set of pixel positions that surrounds the interpolation target position;
  executing, based on the interpolation target position, an image correlation calculation for a plurality of directions in an image plane;
  determining a direction of the plurality of directions based on the execution of the image correlation calculation;
  acquiring information regarding a correlation direction, wherein the correlation direction corresponds to the determined direction;
  determining, based on the information regarding the correlation direction, weight information for each pixel position of the set of pixel positions; and
  generating a second distance histogram of the interpolation target position of the histogram image based on the determined weight information.

16. A signal processing apparatus, comprising:
  a histogram generation unit configured to:
    generate a histogram image that includes a plurality of first distance histograms, wherein
      each first distance histogram of the plurality of first distance histograms is associated with a respective pixel position of a plurality of pixel positions of the histogram image,
      each first distance histogram of the plurality of first distance histograms indicates, as frequency information for each first distance of a plurality of first distances, a plurality of results of a plurality of times of a distance measurement, and
      the plurality of pixel positions includes:
        an interpolation target position, and
        a set of pixel positions that surrounds the interpolation target position;
    determine first weight information based on a second distance from the interpolation target position to each pixel position of the set of pixel positions;
    determine second weight information based on a luminance difference between the interpolation target position and each pixel position of the set of pixel positions; and
    generate a second distance histogram of the interpolation target position of the histogram image based on the determined first weight information and the determined second weight information.

* * * * *